(12) United States Patent
Hibino et al.

(10) Patent No.: US 8,305,880 B2
(45) Date of Patent: Nov. 6, 2012

(54) NETWORK CONTROLLING APPARATUS, NETWORK CONTROLLING METHOD, AND NETWORK CONTROLLING PROGRAM FOR CONTROLLING A DISTRIBUTION MODE IN A NETWORK SYSTEM

(75) Inventors: Yoshihiko Hibino, Hashima-gun (JP); Yuji Kiyohara, Nagoya (JP); Hiroaki Suzuki, Nagoya (JP); Kentaro Ushiyama, Nagoya (JP); Koichi Iijima, Higashikurume (JP)

(73) Assignees: Brother Kogyo Kabushiki Kaisha, Nagoya (JP); Xing Inc., Nagoya (JP)

( * ) Notice: Subject to any disclaimer, the term of this patent is extended or adjusted under 35 U.S.C. 154(b) by 1224 days.

(21) Appl. No.: 11/653,348

(22) Filed: Jan. 16, 2007

(65) Prior Publication Data
US 2007/0133587 A1 Jun. 14, 2007

Related U.S. Application Data

(63) Continuation-in-part of application No. PCT/JP2005/010518, filed on Jun. 8, 2005.

(30) Foreign Application Priority Data

Jul. 16, 2004 (JP) ................................ 2004-210595
Sep. 29, 2004 (JP) ................................ 2004-284563

(51) Int. Cl.
G06F 11/00 (2006.01)
G06F 15/173 (2006.01)
H04L 12/28 (2006.01)
(52) U.S. Cl. ......... 370/221; 370/254; 709/223; 709/239
(58) Field of Classification Search .................. 370/216, 370/218, 221, 225, 226; 709/239, 201, 216, 709/225, 233
See application file for complete search history.

(56) References Cited

U.S. PATENT DOCUMENTS 5,684,807 A * 11/1997 Bianchini et al. ............. 714/712
(Continued)

FOREIGN PATENT DOCUMENTS

JP A 08-130551 5/1996
(Continued)

OTHER PUBLICATIONS

M. Kalman et al., "Adaptive Playout for Real-Time Media Streaming" 2002 IEEE International Symposium on Circuits and Systems. vol. 1, pp. 1-45, Jan. 2002.

(Continued)

*Primary Examiner* — Habte Mered
(74) *Attorney, Agent, or Firm* — Oliff & Berridge, PLC

(57) ABSTRACT

There is provided a network control device capable of surely distributing a content even when a relay function of one of the nodes contained in a network stops, without affecting the process in nodes below the node and while improving the re-liability of the network system itself.

When controlling a node contained in a network system including a server and a plurality of nodes constituting a plurality of hierarchies and connected to one another, wherein a content is distributed from the server to the respective nodes, it is checked whether a content relay function in a node located at the uplink with respect to the node in the content distribution has stopped. When the stop of the relay function is detected, control is performed so that the consumption speed of the content accumulated in the lower node in the process executed in the node is smaller than the consumption speed before the relay function has stopped.

15 Claims, 11 Drawing Sheets

U.S. PATENT DOCUMENTS

| | | | |
|---|---|---|---|
| 7,035,933 B2 * | 4/2006 | O'Neal et al. | 709/233 |
| 7,185,077 B1 * | 2/2007 | O'Toole et al. | 709/223 |
| 7,283,465 B2 * | 10/2007 | Zelig et al. | 370/219 |
| 7,355,975 B2 * | 4/2008 | Liu et al. | 370/235 |
| 7,392,322 B2 | 6/2008 | Ido et al. | |
| 2002/0198780 A1 | 12/2002 | Kawakami et al. | |
| 2003/0012132 A1 * | 1/2003 | Novaes | 370/225 |
| 2003/0101253 A1 | 5/2003 | Saito et al. | |
| 2003/0133464 A1 | 7/2003 | Marejka et al. | |
| 2004/0032916 A1 | 2/2004 | Takashima | |
| 2005/0283525 A1 * | 12/2005 | O'Neal et al. | 709/223 |

FOREIGN PATENT DOCUMENTS

| | | |
|---|---|---|
| JP | A 10-262118 | 9/1998 |
| JP | A 2003-006085 | 1/2003 |
| JP | A 2003-169089 | 6/2003 |
| JP | A-2003-319012 | 11/2003 |
| JP | A 2003-333488 | 11/2003 |
| JP | A 2004-015111 | 1/2004 |

OTHER PUBLICATIONS

Jo J et al., "Synchronized Multicast Media Streaming Employing Server-Client Coordinated Adaptive Playout and Error Control", IEICE Transactions of Communications, vol. E87-B, No. 6, pp. 1670-1680, Jun. 2004.

Hefeeda M M et al., "A Hybrid Architecture for Cost-Effective On-Demand Media Streaming", Computer Networks, Elsevier Science Publishers, vol. 44, No. 3, pp. 353-382, Feb. 20, 2004.

European Search Report dated Sep. 8, 2011 issued in European Patent Application No. 05748668.0-1244.

* cited by examiner

FIG. 2
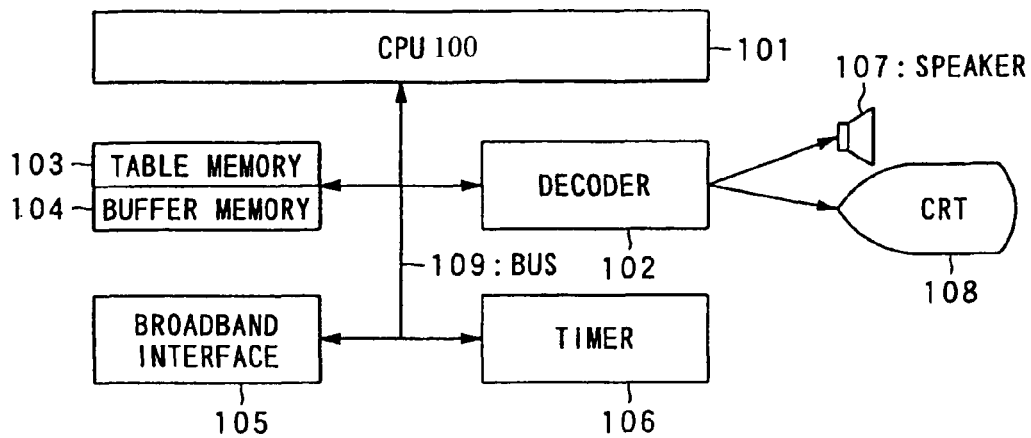
FIG. 3A
| LEVEL | NODE NUMBER | IP ADDRESS |
|---|---|---|
| 2 | 1-1 | 100.100.10.10 |
| 1 | 2-1 | 100.100.10.21 |
| -1 | 4-1 | 100.100.10.30 |
| -1 | 4-2 | 100.100.10.31 |
| -1 | 4-3 | 100.100.10.32 |
T
FIG. 3B
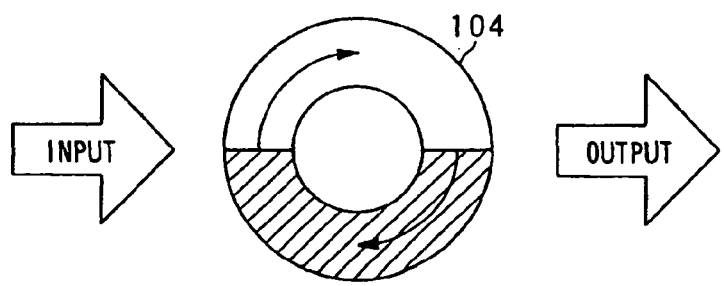

NETWORK CONTROLLING APPARATUS, NETWORK CONTROLLING METHOD, AND NETWORK CONTROLLING PROGRAM FOR CONTROLLING A DISTRIBUTION MODE IN A NETWORK SYSTEM

This is a Continuation-in-Part of Application No. PCT/JP2005/010518 filed Jun. 8, 2005, which claims the benefit of Japanese Applications No. 2004-210595 filed Jul. 16, 2004 and 2004-284563 filed Sep. 29, 2004. The disclosure of the prior applications is hereby incorporated by reference herein in its entirety.

BACKGROUND OF THE INVENTION

1. Field of the Invention

The present invention relates to a technical field of a network controlling apparatus, a connection mode controlling apparatus, a network controlling method, a connection mode controlling method, a network controlling program, and a connection mode controlling program. More specifically, the invention relates to a technical field of a network controlling apparatus, a connection mode controlling apparatus, a network controlling method, a connection mode controlling method, a network controlling program, and a connection mode controlling program for controlling a distribution mode of distributing distribution information distributed from a distribution source in a network system while stepwisely relaying the distribution information in a relay unit which is connected while constructing a hierarchy of a plurality of levels.

2. Discussion of the Related Art

In recent years, as the speed of the Internet lines for houses increases, a network system is being commonly used. In the network system, a network is constructed by connecting personal computers and the like in houses in a tree structure whose apex is a single distributing apparatus as a distribution source, and so-called contents such as music and movies is distributed as distribution information from the distributing apparatus via the network. The network is called "topology" from the viewpoint of the connection mode. Each of the distributing apparatus and the personal computers constructing the network is generally called a "node".

For example, Patent Document 1 discloses a conventional technique of the network system.

Patent Document 1: Japanese Patent Laid-Open No. 2003-169089

In each of nodes included in a conventional network system typified by the network system of Japanese Patent Laid-Open No. 2003-169089, contents transferred from a upper-order node is temporarily stored in a buffer memory and provided for a reproducing process and the like. The configuration is intended to reduce the influence of fluctuations in transfer speed in the Internet circuit constructing a distribution path in the network system. As the buffer memory, for example, an FIFO (First In First Out) memory such as a ring buffer memory is used.

On the other hand, in the network system, the nodes constructing the system are personal computers and the like in houses as described above. Consequently, there may be a case such that the power of any of the nodes on the distribution path is turned off irrespective of whether contents is being distributed or not. In such a case, the function of relaying the contents to lower-order nodes connected to the node whose power switch is turned off stops.

In the case where the relaying function stops in any of the nodes on the distribution path during distribution of contents in the network system, the topology is reconstructed so as to include the nodes other than the node in which the relay function stops (that is, the distribution path from the distributing apparatus to the lower-order nodes directly connected to the node whose relay function stops is reconstructed and distribution is restarted).

SUMMARY OF THE INVENTION

In the reconfiguration of the topology in the conventional network system, however, processes such as search for the shortest path from the distributing apparatus and connection switch using the search result are necessary. As a result, distribution of contents to the lower-order nodes is temporarily interrupted. In the case where the distribution is interrupted, in the lower-order nodes, process of reproducing contents stored in the buffer memory (in other words, consumption of data as contents stored in the buffer memory) continues but new contents to the buffer is not supplied. Consequently, a problem occurs such that the storage amount in the buffer gradually decreases and, in some cases, the contents reproducing process in the lower-order nodes is interrupted.

The interruption of the reproducing process results in deterioration in the reliability of the network system itself in the case where the relay function stops in any of the nodes included in the network system.

The present invention has been achieved in view of the problems and an object of the invention is to provide a network controlling apparatus, a network controlling method, and a network controlling program for controlling a distribution mode in a network system so that, even in the case the relay function of any of nodes included in the network system stops, contents can be distributed with reliability while improving the reliability of the network system itself without influencing processes in lower-order nodes.

To achieve the object, an invention relates to a connection mode controlling apparatus for controlling a connection mode among a distributor as a distribution source of distribution information and a plurality of relays connected to the distributor in a tree structure while forming a plurality of hierarchical levels in a network system in which the distribution information is distributed, the apparatus including: a retrieval means such as a Central Processing Unit (CPU), when relay function in any of the relays stops, for retrieving any of the relays other than the relay whose relay function stops and capable of relaying the distribution information; a connecting means such as a CPU for connecting the relay to receive the distribution information to the retrieved another relay; and a distribution continuing means such as a CPU for continuing the distribution of the distribution information via the connected another relay by making distribution speed of the distribution information via the another relay faster than distribution speed before the relay function stops.

Therefore, when the relay function in any of the relays stops, another relay capable of relaying distribution information is retrieved. When the distribution of the distribution information is continued via the retrieved another relay, distribution speed of the distribution information is made faster than distribution speed before the relay function stops. Consequently, the process of distribution information in a relay belonging to a hierarchical level lower than the relay whose relay function stops can be continued.

To achieve the object, an invention relates to a connection mode controlling apparatus for controlling a connection mode among a distributor as a distribution source of distribution information and a plurality of relays connected to the distributor in a tree structure while forming a plurality of hierarchical levels in a network system in which the distribution information is distributed, the apparatus including: a connecting means such as a CPU for connecting some of the plurality of relays to one of the relays, thereby forming a plurality of paths in which the distribution information is distributed to the one relay; and a distribution control means such as a CPU for distributing the distribution information distributed to the one relay via a main path as one of the paths to another relay belonging to a hierarchical level lower than the one relay, providing the distribution information for an external output process in the one relay, and distributing the distribution information distributed to the one relay via the main path as one of the paths or a sub path as another one of the paths to further another relay belonging to a hierarchical level lower than the one relay.

Therefore, the main path and sub paths are formed so as to connect a plurality of relays to one relay, the distribution information distributed via a main path is used for an external output process in the one relay, and for distribution to another relay belonging to a hierarchical level lower than the one relay. The distribution information distributed via the main path as one of paths or a sub path is also used for distribution to further another relay belonging to a lower hierarchical level. By connecting multiple lines to each of nodes, redundancy can be increased in preparation of stop in the relay function in any of nodes, and the external output process in the relay belonging to the lower hierarchical levels can be prevented from being stopped.

To achieve the object, an invention relates to a connection mode controlling method of controlling a connection mode among a distributor as a distribution source of distribution information and a plurality of relays connected to the distributor in a tree structure while forming a plurality of hierarchical levels in a network system in which the distribution information is distributed, the method including: a retrieval step, when relay function in any of the relays stops, of retrieving any of the relays other than the relay whose relay function stops and capable of relaying the distribution information; a connecting step of connecting the relay to receive the distribution information to the retrieved another relay; and a distribution continuing step, as a distribution connecting step of continuing distribution of the distribution information via the connected another relay, of continuing the distribution by making distribution speed of the distribution information via the another relay faster than distribution speed before the relay function stops.

Therefore, when relay function in any of the relays stops, another relay capable of relaying the distribution information is retrieved. At the time of continuing distribution of the distribution information via the retrieved another relay, distribution speed of the distribution information is made faster than distribution speed before the relay function stops. Thus, the process of distribution information in a relay belonging to a hierarchical level lower than the relay whose relay function stops can be continued.

To achieve the object, an invention relates to a connection mode controlling method of controlling a connection mode among a distributor as a distribution source of distribution information and a plurality of relays connected to the distributor in a tree structure while forming a plurality of hierarchical levels in a network system in which the distribution information is distributed, the method including: a connecting step of connecting some of the plurality of relays to one of the relays, thereby forming a plurality of paths in which the distribution information is distributed to the one relay; and a distribution control step of distributing the distribution information distributed to the one relay via a main path as one of the paths to another relay belonging to a hierarchical level lower than the one relay, providing the distribution information for an external output process in the one relay, and distributing the distribution information distributed to the one relay via the main path as one of the paths or a sub path as another one of the paths to further another relay belonging to a hierarchical level lower than the one relay.

Therefore, a main path and a sub path are formed so as to connect a plurality of relays to one relay, the distribution information distributed via the main path is used for an external output process in the one relay and for distribution to another relay belonging to a hierarchical level lower than the one relay, and the distribution information distributed via the main path as one of paths or the sub path is used for distribution to further another relay belonging to a lower hierarchical level. Thus, by using multiple paths for relays, redundancy can be increased in preparation for stop in the relay function in any of relays, and stop of the external output process in a relay belonging to a low hierarchical level can be prevented.

To achieve the object, an invention makes a computer included in a control mode controlling apparatus for controlling a connection mode among a distributor as a distribution source of distribution information and a plurality of relays connected to the distributor in a tree structure while forming a plurality of hierarchical levels in a network system in which the distribution information is distributed, the instructions cause the computer to function as: a retrieval means, when relay function in any of the relays stops, for retrieving any of the relays other than the relay whose relay function stops and capable of relaying the distribution information; a connecting means for connecting the relay to receive the distribution information to the retrieved another relay; and a distribution continuing means, as a distribution continuing means for continuing distribution of the distribution information via the connected another relay, of continuing the distribution by making distribution speed of the distribution information via the another relay faster than distribution speed before the relay function stops.

Therefore, when relay function in any of the relays stops, another relay capable of relaying the distribution information is retrieved. At the time of continuing distribution of the distribution information via the retrieved another relay, the computer functions to continue the distribution by making distribution speed of the distribution information faster than distribution speed before the relay function stops. Thus, the process of distribution information in a relay belonging to a hierarchical level lower than the relay whose relay function stops can be continued.

To achieve the object, an invention makes a computer included in a connection mode controlling apparatus for controlling a connection mode among a distributor as a distribution source of distribution information and a plurality of relays connected to the distributor in a tree structure while forming a plurality of hierarchical levels in a network system in which the distribution information is distributed, the instructions cause the computer to function as: a connecting means for connecting some of the plurality of relays to one of the relays, thereby forming a plurality of paths in which the distribution information is distributed to the one relay; and a distribution control means for distributing the distribution information distributed to the one relay via a main path as one of the paths to another relay belonging to a hierarchical level lower than the one relay, providing the distribution information for an external output process in the one relay, and distributing the distribution information distributed to the one relay via the main path as one of the paths or a sub path as another one of the paths to further another relay belonging to a hierarchical level lower than the one relay.

Therefore, a main path and a sub path are formed so as to connect a plurality of relays to one relay, the distribution information distributed via the main path is used for an external output process in the one relay and for distribution to another relay belonging to a hierarchical level lower than the one relay, and the distribution information distributed via the main path as one of paths or the sub path is used for distribution to further another relay belonging to a lower hierarchical level. Thus, by using multiple paths for relays, redundancy can be increased in preparation for stop in the relay function in any of relays, and stop of the external output process in a relay belonging to a low hierarchical level can be prevented.

According to the invention, when the relay function in any of the relays stops, another relay capable of relaying distribution information is retrieved. When the distribution of the distribution information is continued via the retrieved another relay, distribution speed of the distribution information is made faster than distribution speed before the relay function stops. Consequently, the process of distribution information in a relay belonging to a hierarchical level lower than the relay whose relay function stops can be continued.

Therefore, even another relay connected below the relay whose relay function stops can continue a process such as reproduction using distribution information without influence of the function stop.

According to the invention, the main path and sub paths are formed so as to connect a plurality of relays to one relay, the distribution information distributed via a main path is used for an external output process in the one relay, and for distribution to another relay belonging to a hierarchical level lower than the one relay. The distribution information distributed via the main path as one of paths or a sub path is also used for distribution to further another relay belonging to a lower hierarchical level. By connecting multiple lines to each of nodes, redundancy can be increased in preparation of stop in the relay function in any of nodes, and the external output process in the relay belonging to the lower hierarchical levels can be prevented from being stopped.

According to the invention, when the relay function in any of the relays stops, another relay capable of relaying the distribution information is retrieved. At the time of continuing distribution of the distribution information via the retrieved another relay, distribution speed of the distribution information is made faster than distribution speed before the relay function stops. Thus, the process of distribution information in a relay belonging to a hierarchical level lower than the relay whose relay function stops can be continued.

Therefore, even another relay connected below the relay whose relay function stops can continue a process such as reproduction using distribution information without influence of the function stop.

According to the invention, a main path and a sub path are formed so as to connect a plurality of relays to one relay, the distribution information distributed via the main path is used for an external output process in the one relay and for distribution to another relay belonging to a hierarchical level lower than the one relay, and the distribution information distributed via the main path as one of paths or the sub path is used for distribution to further another relay belonging to a lower hierarchical level. Thus, by using multiple paths for relays, redundancy can be increased in preparation for stop in the relay function in any of relays, and stop of the external output process in a relay belonging to a low hierarchical level can be prevented.

According to the invention, when relay function in any of the relays stops, another relay capable of relaying the distribution information is retrieved. At the time of continuing distribution of the distribution information via the retrieved another relay, the computer functions to continue the distribution by making distribution speed of the distribution information faster than distribution speed before the relay function stops. Thus, the process of distribution information in a relay belonging to a hierarchical level lower than the relay whose relay function stops can be continued.

Therefore, even another relay connected below the relay whose relay function stops can continue a process such as reproduction using distribution information without influence of the function stop.

According to the invention, the computer functions so that a main path and a sub path are formed so as to connect a plurality of relays to one relay, the distribution information distributed via the main path is used for an external output process in the one relay and for distribution to another relay belonging to a hierarchical level lower than the one relay, and the distribution information distributed via the main path as one of paths or the sub path is used for distribution to further another relay belonging to a lower hierarchical level. Thus, by using multiple paths for relays, redundancy can be increased in preparation for stop in the relay function in any of relays, and stop of the external output process in a relay belonging to a low hierarchical level can be prevented.

BRIEF DESCRIPTION OF THE DRAWINGS

FIG. 2 is a block diagram showing a general configuration of a node included in the network system according to the first embodiment.

FIGS. 3A and 3B are diagrams showing a detailed configuration of nodes according to the first embodiment, and illustrating the details of a topology table and an operation of a buffer memory, respectively.

FIG. 8A is a flowchart showing the operation, and FIG. 8B is a diagram showing operation of a buffer memory corresponding to the operation.

DESCRIPTION OF REFERENCE NUMERALS

Figure 1:
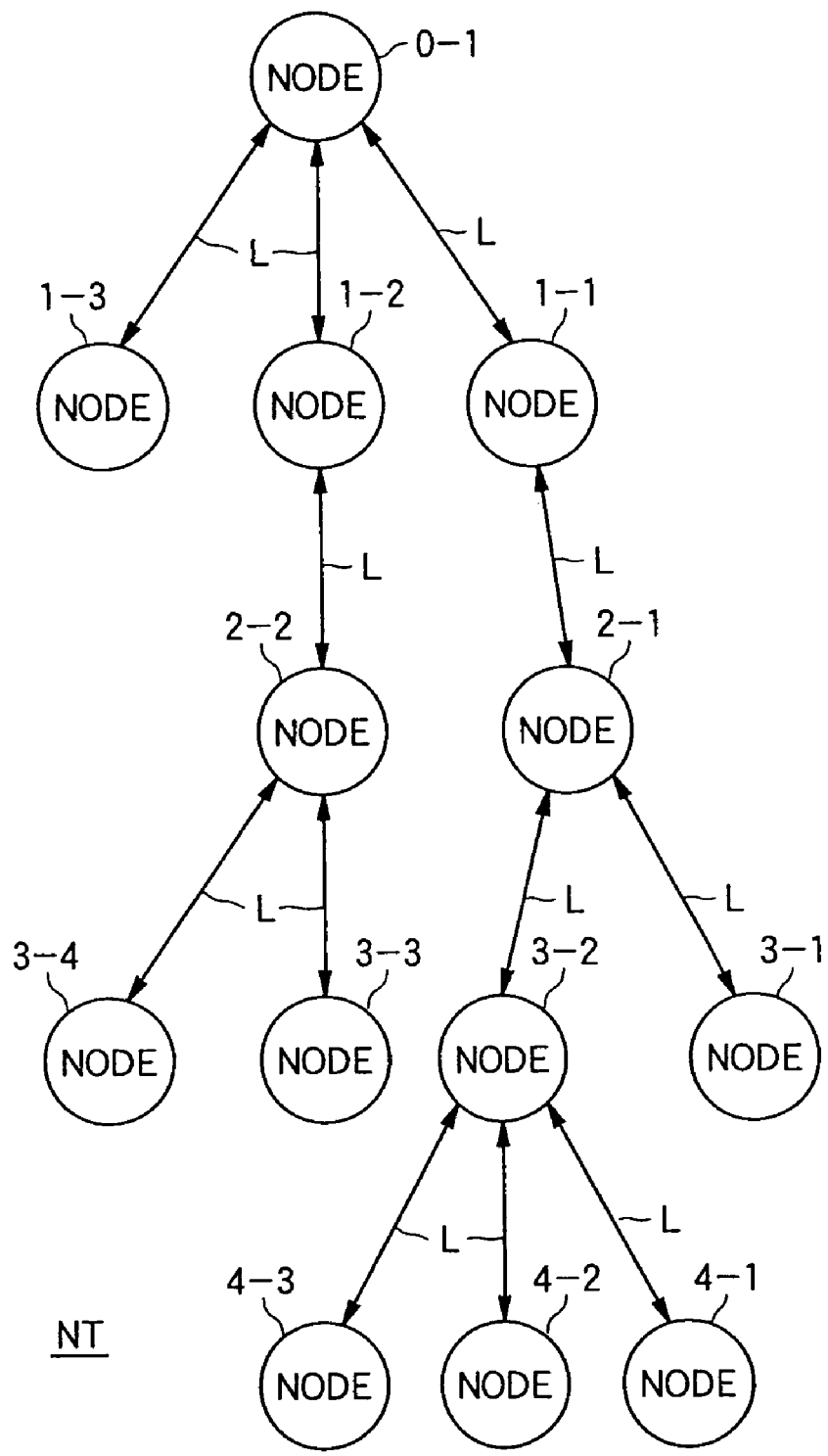
FIG. 1 is a block diagram showing a schematic configuration of a network system according to a first embodiment.

100 CPU
109 bus 102 decoder
103 table memory
104 buffer memory
105 broadband interface
106 timer
107 speaker
108 CRT
0-1, 1-1, 1-2, 1-3, 2-1, 2-2, 3-1, 3-2, 3-3, 3-4, 4-1, 4-2, 4-3 node
NT network
L, L' line
LM, LM' main line
LS, LS' sub line
NT, NT2 network system

DETAILED DESCRIPTION OF THE PREFERRED EMBODIMENTS (I) First Embodiment (A) Embodiment A first embodiment according to the present invention will be described first with reference to FIG. 1 to FIGS. 8A and 8B.

Figure 4:
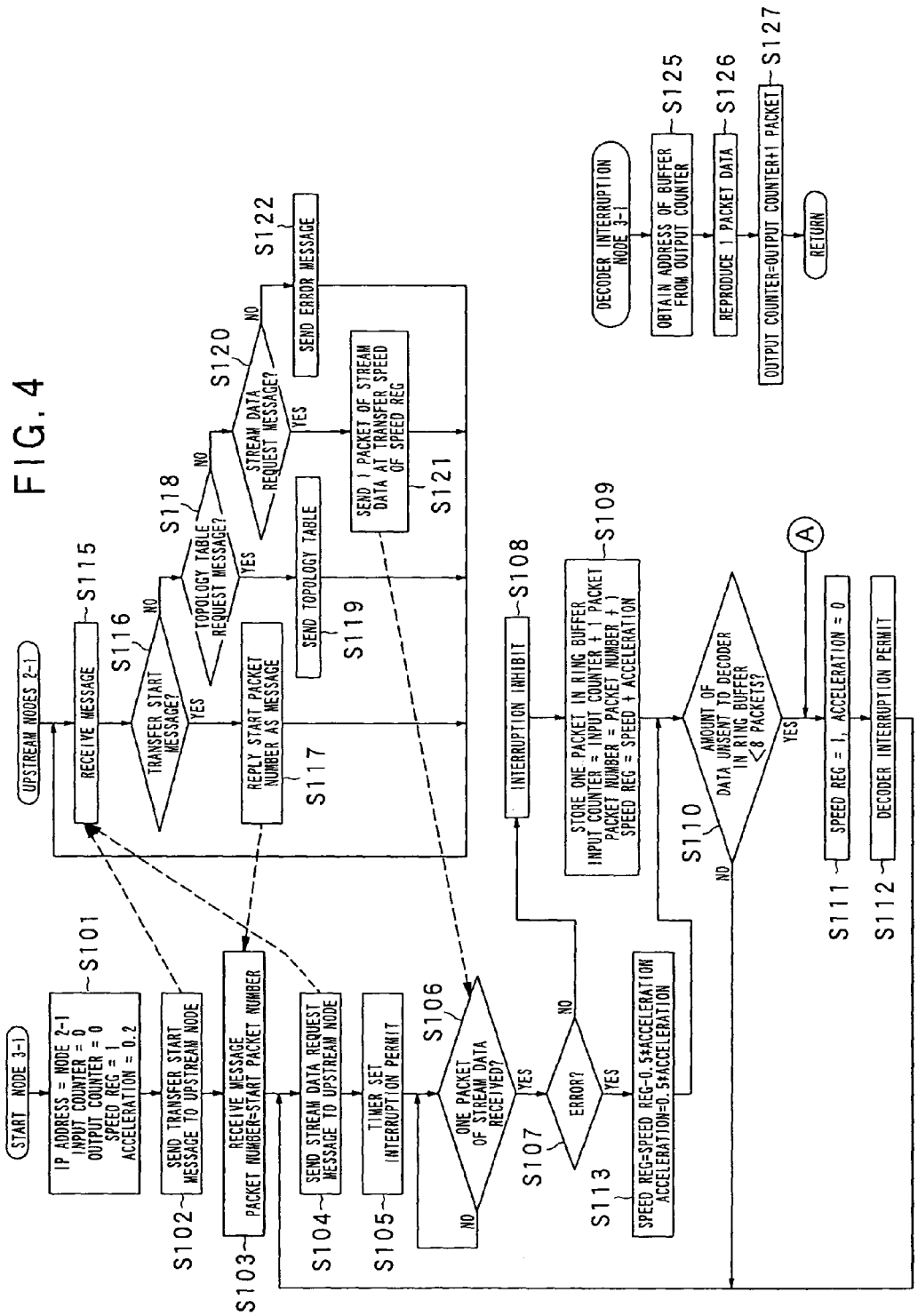
FIG. 4 is a flowchart showing normal distributing operation in the network system according to the first embodiment.
Figure 5:
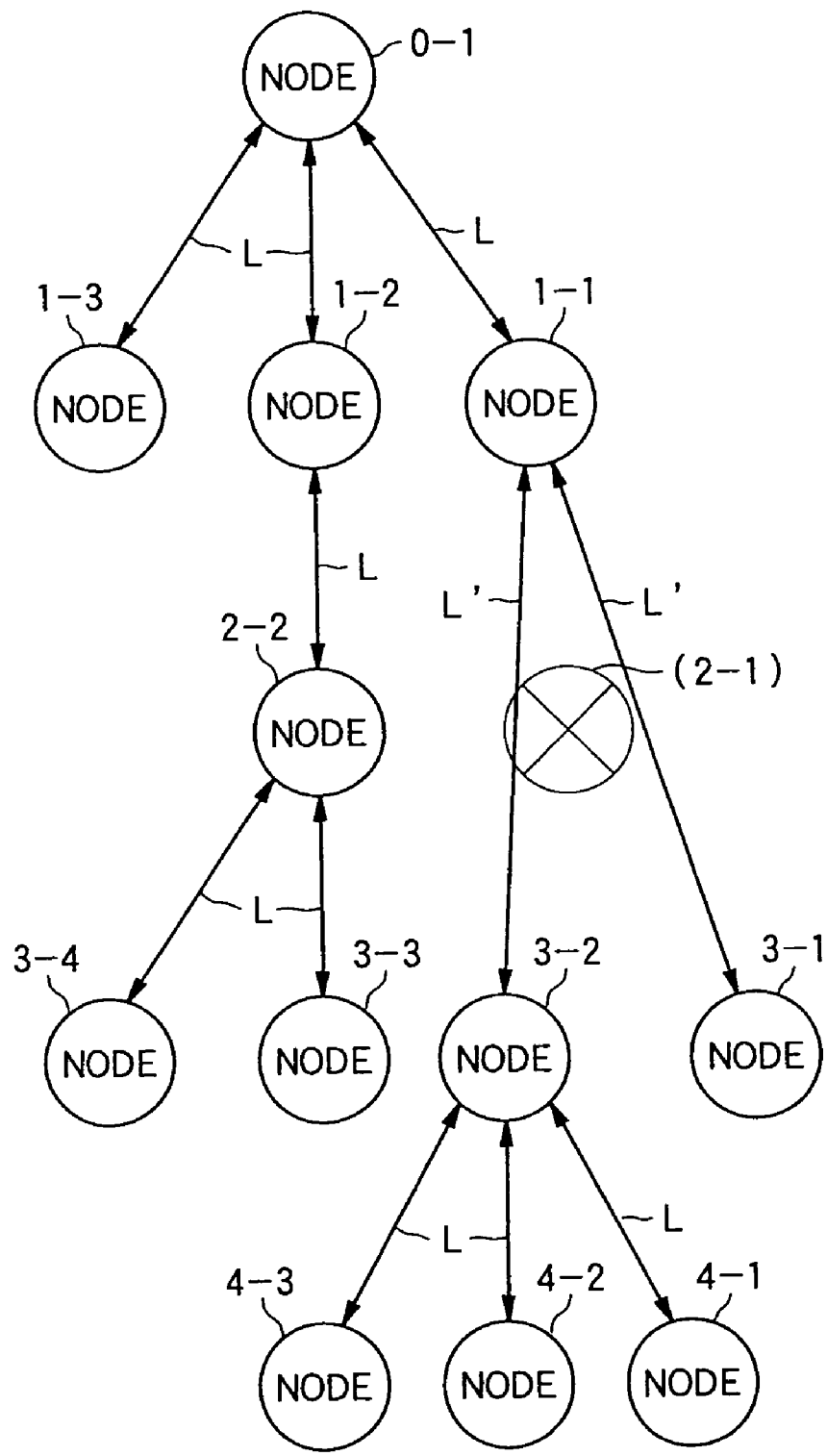
FIG. 5 is a block diagram showing a schematic configuration of the network system according to the first embodiment after the relay function in part of the nodes stops.
Figure 6A:
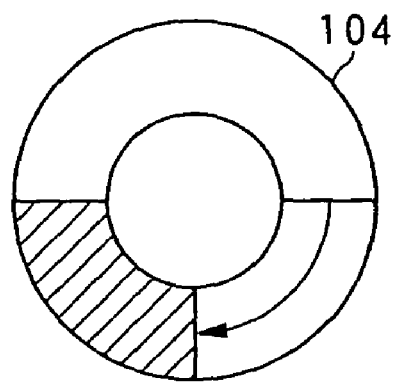
FIGS. 6A, 6B, and 6C are a flowchart showing operations in a lower-order node when the relay function in part of nodes stops and illustrating operations of the buffer memory.
Figure 6B:
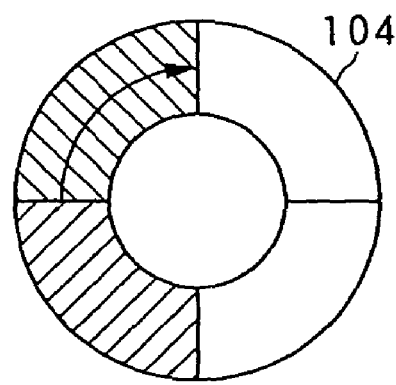
Figure 6C:
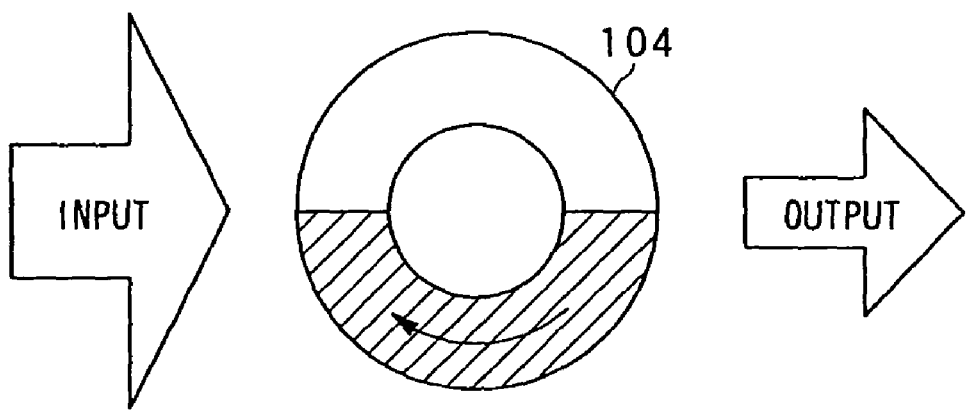
Figure 7:
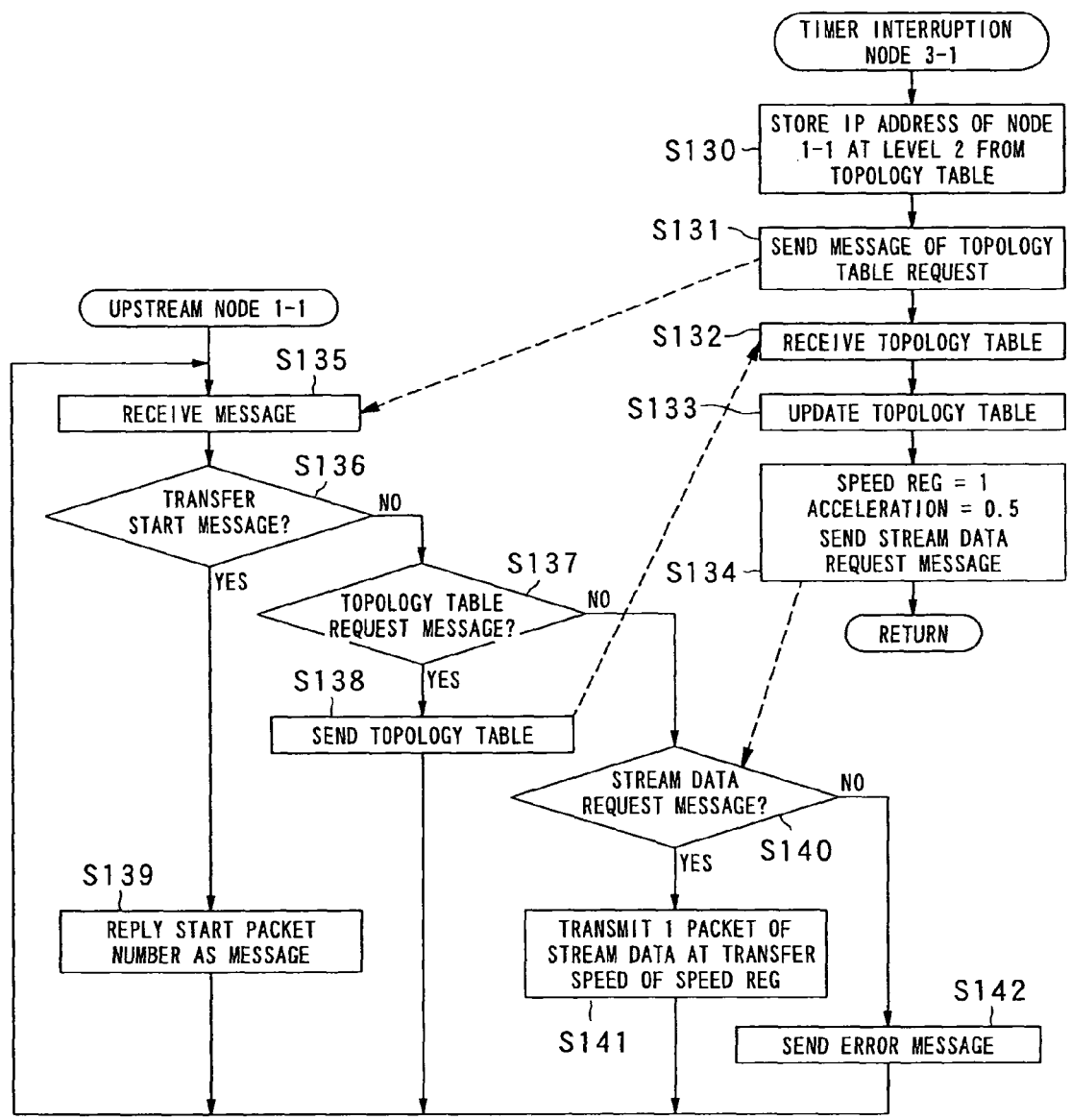
FIG. 7 is a diagram showing operation of a lower-order node when the relay function in part of nodes stops.
Figure 8A:
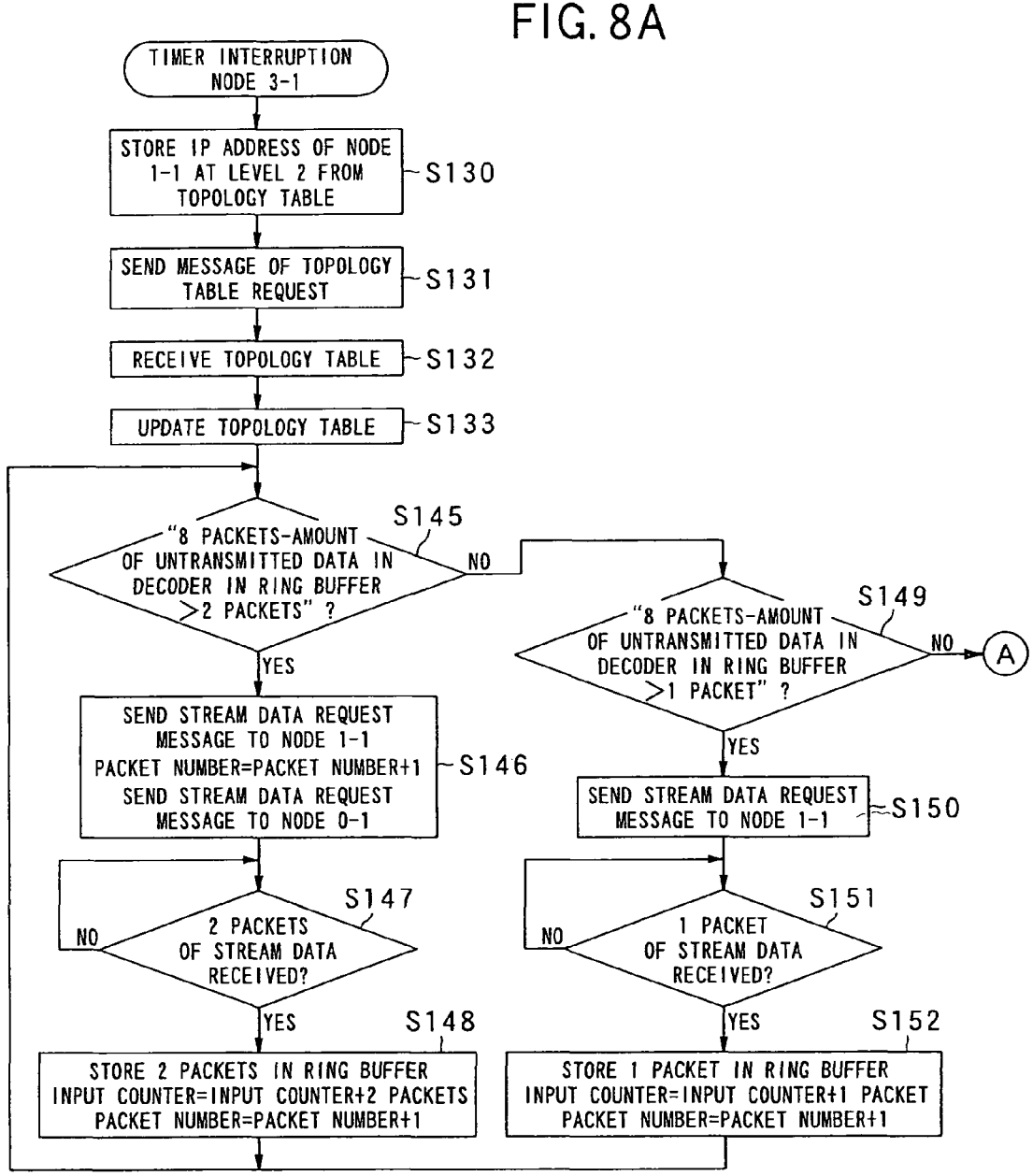
FIGS. 8A and 8B are diagrams showing operation in a network system according to a modification of the first embodiment.
Figure 8B:
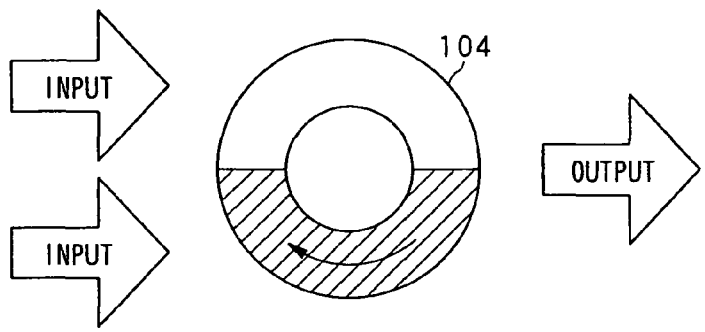

FIG. 1 is a block diagram showing a schematic configuration of a network system according to a first embodiment. FIG. 2 is a block diagram showing a general configuration of a node included in the network system. FIGS. 3A and 3B are diagrams showing a detailed configuration of the node. FIG. 4 is a flowchart showing normal distributing operation in the network system. FIG. 5 is a block diagram showing a schematic configuration of the network system after the relay function in part of the nodes stops. FIGS. 6A, 6B, and 6C are a flowchart showing operations in a lower-order node when the relay function stops. FIG. 7 is a diagram showing operations of a lower-order node when the relay function stops. FIGS. 8A and 8B are diagrams showing operation in a network system according to a modification of the first embodiment.

As shown in FIG. 1, a network system NT according to the first embodiment is formed by a tree structure using a node 0-1 as a distributing apparatus as the apex. The network system NT includes nodes 1-1, 1-2, and 1-3 as nodes constructing the first hierarchical level, nodes 2-1 and 2-2 as nodes constructing the second hierarchical level, nodes 3-1, 3-2, 3-3, and 3-4 as nodes constructing the third hierarchical level and, further, nodes 4-1, 4-2, and 4-3 as nodes constructing the fourth hierarchical level. The nodes are connected to each other via lines L as wire circuits or wireless circuits so as to be able to transmit/receive information to/from each other using the node 0-1 as the apex. As concrete examples of the nodes, the node 0-1 at the highest order corresponds to, for example, as server as a contents distribution source, and all of the nodes other than the node 0-1 are, for example, personal computers in houses. The node may be a set top box or a router in a house.

In the network system NT shown in FIG. 1, contents distributed from the node 0-1 and desired by the user of a node is distributed via other nodes included in the hierarchical levels higher than the node via the lines L. Obviously, the contents is distributed in a digitized state in units of so-called packets. Further, packets to which sequential packet numbers indicative of the order of reproduction or storage to the buffer memory 104 (refer to FIG. 2) or the like are assigned are distributed.

A concrete configuration of each node will be described with reference to FIG. 2 and FIGS. 3A and 3B. In the following, the detailed configuration of the node 3-2 in the network system NT shown in FIG. 1 will be described. The detailed configuration of each of the other nodes is the same as that of the node 3-2.

As shown in FIG. 2, the node 3-2 has a CPU 100 as a retrieval means, connection means, distribution relay means, a distribution control means, and switching means, a decoder 102, a table memory 103, a buffer memory 104, a broadband interface 105, a timer 106, a speaker 107, and a CRT (Cathode Ray Tube) 108 as display means. The CPU 100, decoder 102, table memory 103, buffer memory 104, broadband interface 105, and timer 106 are connected to each other via a bus 109.

Next, the operation will be described.

The broadband interface 105 is directly connected to the line L. As shown in FIG. 1, the broadband interface 105 in the node 3-2 is connected to the broadband interface 105 included in the node 2-1 at the immediately higher hierarchical level via the line L, and is also connected to the broadband interfaces 105 included in the nodes 4-1 to 4-3 at the immediately lower hierarchical level via the lines L. Transmission/reception of contents and transmission/reception of control information necessary for the contents transmission/reception can be performed on the packet unit basis among the nodes.

In the table memory 103 as a nonvolatile memory, a topology table T as shown in FIG. 3A is stored. In the topology table T, node numbers for identifying other nodes at the higher or lower hierarchical level in accordance with the position in the network system NT of the node including the table memory 103 in which the topology table T is stored, and IP (Internet Protocol) addresses in the network system N are included together with level information indicative of hierarchical levels. Since the topology table T illustrated in FIG. 3A corresponds to the node 3-2, it includes the level information of the node 1-1 at the hierarchical level (level 2) higher than the node 3-2 by two levels as shown in FIG. 1, the node number of the node 1-1, and the IP address (for example, "100.100.10.10") of the node 1-1.

Similarly, the topology table T includes: the level information of the node 2-1 at the hierarchical level (level 1) immediately higher than the node 3-2, the node number of the node 2-1, and the IP address (for example, "100.100.10.21") of the node 2-1; the level information of the node 4-1 at the hierarchical level (level −1) immediately lower than the node 3-2, the node number of the node 4-1, and the IP address (for example, "100.100.10.30") of the node 4-1; the level information of the node 4-2 at the hierarchical level (level −1) immediately lower than the node 3-2, the node number of the node 4-2, and the IP address (for example, "100.100.10.31") of the node 4-2; and the level information of the node 4-3 at the hierarchical level (level −1) immediately lower than the node 3-2, the node number of the node 4-3, and the IP address (for example, "100.100.10.32") of the node 4-3.

Referring again to FIG. 2, the buffer memory 104 as a volatile memory is a ring buffer memory of a so-called FIFO (First In First Out) form. The buffer memory 104 stores data corresponding to distributed contents in accordance with the distribution order only by a preset recording capacity, reads the data in accordance with the stored order under control of the CPU 100, and outputs the read data to the decoder 102 via the bus 109.

The operation of the buffer memory 104 in the case where the network system NT is in a normal state will be described with reference to FIG. 3B.

As described above, the buffer memory 104 is constructed in a ring shape. For example, as shown conceptually in the upper half of FIG. 3B, data of contents is input clockwise via the broadband interface 105 and, as shown conceptually in the lower half of FIG. 3B, the data is output clockwise to the decoder 102. In the example shown in FIG. 3B, data in the hatched part is contents data actually stored. In parallel with output of the data to the decoder 102 as shown by the arrow in the lower half of FIG. 3B, new data is input from the broadband interface 105 and stored as shown by the arrow in the upper half of FIG. 3B. In the normal state, a data input amount and a data output amount in the buffer memory 104 per unit time are the same, and the storage amount in the buffer memory 104 is maintained to be constant (more concretely, the storage amount of the half of the buffer memory 104).

On the other hand, when arrival time of a packet as the data fluctuates in the case such that the topology in the network system NT is changed, the fluctuation can be absorbed by the buffer memory 104. In the case where the decoder 102 decodes a predetermined amount of data in a lump or in the case where the topology is disconnected for some reason, the buffer memory 104 functions so as to always store a predetermined amount of data so that the buffer memory 104 does not become empty and the reproducing process in the decoder 102 is not interrupted.

Referring again to FIG. 2, the timer 106 performs counting for detecting that the relay function in any of the nodes in the network system NT stops as will be described later.

The decoder 102 decodes data of contents output from the buffer memory 104 via the bus 109, outputs an image in the data to the CRT 108 where the image is displayed, and outputs sound in the data via the speaker 107.

Next, a new node is connected to the network system NT. Operations started and executed in a normal state in which the new node is included and contents is distributed will be described in a lump by using FIG. 4. FIG. 4 is a flowchart showing an example of the case where the node 3-1 is newly connected to the node 2-1 in the network system NT so that the network system NT shown in FIG. 1 is obtained, and contents is distributed to the node 3-1. In the embodiment described below, it is assumed that the total storage capacity of the buffer memory 104 is 64 kilobytes which correspond to the data amount of 16 packets.

When the node 3-1 newly enters the network system NT by being physically connected to the node 2-1, first, the CPU 100 in the node 3-1 sets the buffer memory 104 (hereinbelow, in each of the drawings, the buffer memory 104 itself will be properly called "ring buffer") in the node 3-1. The CPU 100 in the node 3 sets a speed parameter (in the diagrams, shown as "speed Reg") indicative of reproduction speed in the decoder 102 to the same as normal reproduction speed, and sets the IP address of a node as the data supply source into the node 2-1 at the immediately high order (the IP address of the node 2-1 is obtained by the node 3-1 when the node 3-1 is connected to the node 2-1). To calculate an address for storing data in the buffer memory 104, the CPU 100 initializes each of an input counter (16 bits) for counting the number of bytes of input data distributed from the node 2-1 and an output counter (16 bits) indicative of an amount of data reproduced by the decoder 102 to "zero" (step S101).

The address for storing data input to the buffer memory 104 is "the head address in the buffer memory 104 and the value of the input counter", and the address for reading data to the decoder 102 is "the head address of the buffer memory 104+ the value of the output counter".

After completion of the necessary initializing process, next, the CPU 100 in the node 3-1 transmits a start message requesting for start of contents data transfer to the data node 2-1 with reference to the topology table T in the table memory 3 (step S102).

Next, the CPU 100 in the node 2-1 what receives the start message (S115) determines whether the received message is a start message or not (step S116). Since the message presently received is the start message (Y in step S116), the CPU 100 returns the packet number of data presently reproduced by the node 2-1 as start packet number to the node 3-1 (step S117).

When the node 3-1 obtains the start packet number from the node 2-1, the node 3-1 stores it into the area of the corresponding packet number on the buffer memory 104 (step S103) and transmits a data request message requesting for actual contents data to the node 2-1 (step S104). The data request message includes information indicative of the packet number of data to be transmitted to the node 3-1 and distribution speed (the parameter "speed Reg" in the node 2-1).

The node 2-1 which has received the data request message (step S115) determines again whether the received message is a start message or not (step S116). Since the message presently received is the data request message (N in step S116), the node 2-1 determines whether the received message is a message that requests for the topology table T or not (step S118).

The determining operation in the step S118 (and process of transmitting the topology table T from the node 2-1 in the case where "Y" in the step S118) is executed in preparation for the case where when the relay function in any of the nodes in the network system NT stops, another node connected below the node whose relay function stops obtains the topology of the network system NT. The operation is a process which is meaningless in the processes between the present node 3-1 and the node 2-1 (therefore, the process of transmitting the topology table T from the node 2-1 (step S119) is not naturally execute).

Since the message presently received is the data request message but is not the topology request message in the determination of step S118 (N in step S118), next, whether the received message is the data request message or not is determined (step S120). Since the message presently received is the data request message (Y in step S120), data of one packet is transmitted to the node 3-1 (via the line L) at the reproduction speed designated in the data request message (1× at present) (step S121). When it is determined in the step S120 that the message received from the node 3-1 at that time is not any of the start message, the topology table request message, and the data request message (N in step S120), a preset error message is sent back to the node 3-1 (step S122).

In parallel with the operations, the node 3-1 is set so as to start counting in the timer 106 in the node 3-1 simultaneously with outputting of the data request message and, when the counting becomes "0", generate a timer interrupt instruction (step S105). The node 3-1 waits until predetermined time elapses in the counting of the timer 106 (step S106). When data from the node 2-1 does not arrive within the predetermined time (N in step S106), the timer interrupt instruction is executed, and the connecting process is performed again on the node 2-1.

On the other hand, when data from the node 2-1 arrives within the predetermined time (Y in step S106), whether the arrived data has been transmitted correctly or not is determined (step S107). If the data has been transmitted correctly (Y in step S107), execution of the timer interrupt instruction is inhibited (step S108), and an amount of one packet of the received data is stored in the buffer memory 104. In association with the operation, the values of the input counter and the number of packets stored in the buffer memory 104 are updated only by one packet and, further, the speed parameter is increased only by the amount of present acceleration (which is set in the initializing process in the step S101) (step S109).

Whether the amount of data which is stored in the buffer memory 104 and is not output to the decoder 102 has become eight packets (that is, the storage amount of the half of the buffer memory 104) or not is determined (step S110). When the amount is less than eight packets (Y in step S110), the node 3-1 returns to the step S104 to receive the next packet and repeats the above-described processes. On the other hand, when the data amount stored in the buffer memory 104 becomes eight packets (N in step S110), resets the speed parameter and the acceleration to the initial values (step S11), starts outputting data to the decoder 102 (step S112), and returns to the process in the step S104 so as to continuously receive the subsequent data from the node 2-1.

By repeating the processes in the steps S104 to S110, the speed of distribution from the node 2-1 increases by the acceleration at that time (the initial value of 0.2 time) until data of an amount corresponding to eight packets is stored in the buffer memory 104, and the buffer memory 104 is charged at high speed until reception of data becomes an error (Y in step S107). On the other had, when an error occurs in reception of data Y in step S107), the distribution speed after that is decreased only by 0.5 time of the acceleration (step S113) to make data transmission reliably and then distribution is continued.

In the process of the step S112, when data of the amount of eight packets is stored in the buffer memory 104 and the data is output to the decoder 102, the decoder 102 obtains the address of the data output from the buffer memory 104 on the basis of the value of the output counter in the buffer memory 104 at that time (step S125), decodes and reproduces the data only by one packet (step S126), and increments the value of the output counter in the buffer memory 104 only by one packet (step S127). The processes are repeated only by the amount of eight packets, thereby performing the data reproducing process.

By executing the data distribution from the node 2-1 and the reproducing process in the node 3-1 as described above, the data reproducing process in the node 3-1 is executed while maintaining the data amount in the buffer memory 104 to be constant.

Next, processes performed in the case where the contents relay function in the node 2-1 stops for a reason such that the power switch is turned off in the network system NT shown in FIG. 1 will be concretely described with reference to FIGS. 5 to 7.

In the network system NT according to the first embodiment, when the relay function in the node 2-1 stops for the above-described reason, as shown in FIG. 5, the nodes 3-1 and 3-2 connected to the original node 2-1 automatically execute topology reconstructing operation of connecting themselves to the node 1-1 at the immediately higher hierarchical level of the node 2-1 via lines L', and continue distribution of contents.

First, the general operation in the nodes 3-1 and 3-2 in the case where the relay function in the node 2-1 stops as shown in FIG. 5 will be described.

When the relay function in the node 2-1 stops as shown in FIG. 5, the CPU 100 in each of the nodes 3-1 and 3-2 at the immediately lower hierarchical level (since distribution in the normal state continues, the processes described with reference to FIG. 4 are repeated) cannot receive data from the node 2-1 even after predetermined time elapses in the process of the step S106 shown in FIG. 4. When data cannot be received even after lapse of the predetermined time (N in step S106), the CPU 100 in each of the nodes 3-1 and 3-2 recognizes that the relay function in the node 2-1 at the immediately higher hierarchical level stops and the topology is disconnected.

After that, on recognition of disconnection of the topology, with reference to the topology table T stored in the table memory 103, the topology is reconfigured so that the nodes 3-1 and 3-2 are connected to the node 1-1 at the level higher by two levels via the newly formed lines L'. The node 2-1 is deleted from the topology table T in the table memory 103 in each of the nodes 3-1 and 3-2 and, simultaneously, the level information of the node 1-1 is updated to "1". After that, each of the nodes 3-1 and 3-2 transmits the topology request message (refer to the steps S118 and S119 in FIG. 4) to the node 1-1, and obtains the new topology table T from the node 1-1. On the basis of the obtained topology table T, it is recognized that the node at the immediately higher hierarchical level of the node 1-1 is the node 0-1 and, simultaneously, the IP address and the node number of the node 0-1 whose level information is "2" are added to the topology table T (in each of the nodes 3-1 and 3-2), thereby completing reconfiguration of the topology.

After that, each of the nodes 3-1 and 3-2 requests the node 1-1 to transmit packets having packet number subsequent to the packets obtained until then (refer to the step S104 in FIG. 4), and the node 1-1 receives the request and starts transmission of the subsequent data to the nodes 3-1 and 3-2 as new destinations.

Changes in the buffer memory 104 in each of the node 1-1 and the nodes 3-1 and 3-2 during reconfiguration of the topology will be described with reference to FIGS. 6A to 6C.

As described above, the nodes 3-1 and 3-2 at the hierarchical level immediately lower than the node 2-1 cannot receive data from the node 2-1 when the relay function of the node 2-1 stops, so that the data amount in the buffer memory 104 in each of the nodes 3-1 and 3-2 decreases. Meanwhile, the decoders 102 in the nodes 3-1 and 3-2 continue reading data for reproduction process from the buffer memories 104. Therefore, as shown in FIG. 6A, the data in each of the buffer memories 104 continuously decreases.

On the other hand, the node 1-1 at the lever immediately higher than the node 2-1 cannot transfer data to the nodes at the lower hierarchical levels, so that the data amount in the buffer memory 104 in the node 1-1 continuously increases as shown in FIG. 6B.

After reconfiguration of the topology, the nodes 3-1 and 3-2 newly connected at the level lower than the node 1-1 have to recover their buffer memories 104 to the normal state (that is, the state where data is stored to the half) as promptly as possible. If data cannot be continuously received from the upper-order node and the decoders 102 in the nodes 3-1 and 3-2 continue reading data from the buffer memories 104, finally, the buffer memories 104 become empty and the reproducing process in the nodes 3-1 and 3-2 is interrupted.

Consequently, in the first embodiment, the nodes 3-1 and 3-2 trying to achieve early recovery of the storage amount in their buffer memories 104 transmit a control signal (command) for increasing distribution speed to the newly connected node 1-1. The node 1-1 which receives the command distributes data to (the buffer memories 104 in) the nodes 3-1 and 3-2 at a distribution speed which is twice as high as the normal reproducing processing speed in the nodes 3-1 and 3-2, for example, as shown in FIG. 6C. By the operation, the storage amount in the buffer memory 104 recovers to the normal state in almost the same time as that required to reconfigure the topology.

As a mode of increasing the distribution speed, more concretely, the maximum value of the distribution speed is determined by the transfer processing capability of the CPU 100 in each of the nodes related to a so-called bandwidth (frequency band) of the lines L and L'. Considering general redundancy, about twice as high as the normal reproduction processing speed as described above is proper.

As another mode of changing the distribution speed, for example, the distribution speed is not doubled immediately but the node 1-1 may continuously increase the distribution speed at a predetermined rate until a control signal notifying of a fact that the storage amount in the buffer memory 104 in each of the nodes 3-1 and 3-2 has reached a predetermined amount is transmitted from the nodes 3-1 and 3-2. Since the increase in the distribution speed has a limit depending on the output capability of the node 1-1 and the bandwidth of the lines L' connecting the nodes 3-1 and 3-2, whether a packet from a node at a high hierarchical level has reached a node at a low hierarchical node or not is grasped by exchanging necessary messages between the nodes or with another controller. The distribution speed is increased to the allowable highest speed and a packet is transferred at the increased speed. In such a manner, the storage amount in each of the buffer memories 104 can be recovered in the shortest time. The node 3-2 transmits a packet to the lower-order nodes 4-1 and 4-2 at the same speed as that of reception of a packet from the node 1-1.

Next, operations performed when the relay function of the node 2-1 in the network system NT according to the first embodiment stops and the nodes 3-1 and 3-2 at the lower hierarchical level are reconnected to the node 1-1, thereby reconfiguring the topology of the network system NT as shown in FIG. 5 will be described in a lump by using the flowchart of FIG. 7. In the following, the reconnecting operation in the node 3-1 out of the two nodes 3-1 and 3-2 connected to the node 2-1 will be described. The reconnecting operation in the node 3-2 is also similarly executed.

Until the relay function of the node 2-1 stops, the processes shown in FIG. 4 are repeated in the node 3-1. When data from the node 2-1 does not arrive even after lapse of predetermined time in the process of the step S106 shown in FIG. 4, the node 3-1 determines that the relay function in the node 2-1 at the high hierarchical level stops, and starts reconnection of the tree structure.

Concretely, as shown in FIG. 7, in the case where data from the node 2-1 cannot be received within the predetermined time, a timer interrupt instruction is generated in the node 3-1 (refer to the step S105 in FIG. 4), the IP address of the node 1-1 at the hierarchical level immediately higher than the node 2-1, that is, the node 1-1 whose level information seen from the node 3-1 is "2" is obtained from the topology table T in the table memory 103 (step S130), and the information in the topology table T related to the node 2-1 is deleted. After that, the node 3-1 transmits a topology table request message to obtain the topology table T in the node 1-1 to the node 1-1 indicated by the IP address (step S131).

During the topology reconfiguring process, in the node 1-1 at the higher hierarchical level, the same operations (the steps S135 to S142 in FIG. 7) as the operations (the steps S115 to S122 in FIG. 4) performed in the node 2-1 shown in FIG. 4 are executed. The type of a message transmitted from the node 3-1 is determined (steps S136, S137, and S140) and the process (steps S139, S138, S141, and S142) according to the determined type of the message is executed.

In the node 101 in which such processes are executed, when the topology table request message is received from the node 3-1 (step S135) and it is determined that the message is the topology table request message (Y in step S137), the node 1-1 transmits the topology table T stored in the table memory 103 to the node 3-1 (step S138).

The node 3-1 which receives the topology table T (step S132) updates the existing topology table T with the topology table T obtained from the node 1-1 (step S133). More concretely, the node 3-1 recognizes the node 0-1 ad adds the IP address and the node number of the node 0-1.

After that, to recover the storage amount in the buffer memory 104 in the node 3-1 at high speed, the speed parameter is set to "1", acceleration is set to 0.2, and the data request message is transmitted from the node 3-1 to the node 1-1 (step S134). After that, the node 3-1 returns to the step S1105 shown in FIG. 4 and repeats the operations in the steps S105 to S112 as a normal state.

Until an amount of one packet of data corresponding to the data request message is received from the node 1-1, data in the buffer memory 104 is continuously decoded and keeps on decreasing (refer to FIG. 6A). When data starts to be distributed from the node 1-1 (steps S140 and S141), the data is distributed while gradually increasing the distribution speed until data of an amount corresponding to eight packets is stored in the buffer memory 104 (step S109 in FIG. 4). After data of the amount corresponding to eight packets is stored, the buffer memory 104 in the node 3-1 starts functioning in the normal state (refer to FIG. 3B).

As described above, in the process of controlling the connection mode in the network system NT according to the first embodiment, when the relay function in any of nodes stops, another node capable of relaying contents is retrieved. At the time of continuing distribution of contents via the retrieved another node, the distribution speed is made higher than that before stop of the relay function. Thus, the process of contents can be continued in a node belonging to the hierarchical level immediately lower than the node whose relay function stops.

Since distribution is continued while gradually increasing the speed of contents distribution via a newly connected another node to the upper limit speed as the maximum value of the distribution speed, a node belonging to a lower hierarchical level can obtain necessary contents more promptly. It is also possible to detect an amount of unreproduced data stored in the buffer of the node after the relay function stops and the topology is reconfigured and control time in which the distribution speed reaches the highest speed in accordance with the detected unreproduced data amount.

(B) Modification of Second Embodiment

A modification of the first embodiment will be described with reference to FIG. 8. FIG. 8 shows a flowchart showing the operations of the modification.

In the foregoing first embodiment, when the relay function of the node 2-1 stops, another node (node 1-1) at the higher hierarchical level is retrieved and distribution of contents is newly continued from the node. In the following modification, a plurality of new nodes are retrieved and distribution of contents is continued simultaneously from the plurality of nodes.

In the case where the node 3-1 according to the modification cannot receive data from the node 2-1 within the predetermined time as shown in FIG. 8A, the steps S130 to S133 shown in FIG. 7 are executed to update the topology table T in the node 3-1.

While receiving data distributed from the node 2-1, whether the difference between the storage amount (the number of packets) at that time in the buffer memory 104 and a required storage amount (eight packets) in the buffer memory 104 in the normal state is larger than two packets or not (that is, further data storage is becoming necessary or not) is determined (step S145). When the difference becomes larger than two packets (that is, when further data storage is becoming necessary, Y in step S145), a new data request message is transmitted to the node 1-1, the number of a packet to be received is updated, and a data request message is transmitted to the node 0-1 at the hierarchical level immediately higher than the node 1-1 (step S146). Whether data of one packet each from the nodes 1-1 and 0-1, that is, data of total two packets has been received or not is determined (step S147). When data of two packets has not been received yet (N in step S147), the node 3-1 waits until data of two packets is received. On the other hand, when data of two packets has been received (Y in step S147), the data of two packets is stored in the buffer memory 104, the input counter is updated only by the two packets, the number of a packet to be received is updated (step S148), and the node 3-1 returns to the step S145.

On the other hand, when it is determined in the step S145 that the difference is not larger than two packets (that is, further data storage is unnecessary, N in step S145); whether the difference is larger than one packet or not (that is, whether data does not have to be replenished urgently or not) is determined (step S149). When the difference is not larger than one packet (that is, the storage amount in the buffer memory 104 at present is in the normal state) (N in step S149), the node 3-1 returns to the step S111 in FIG. 4 and continues the normal receiving process.

On the other hand, when the difference is larger than one packet (that is, the storage amount in the buffer memory 104 at present is close to the normal state and it is unnecessary to urgently replenish data) (Y in step S149), the node 3-1 transmits a new data request message to the node 1-1 (step S150) and waits until predetermined time elapses in the counting of the timer 6 in the node 3-1 (step S151). If data from the node 2-1 does not arrive within the predetermined time (N in step S151), the timer interrupt instruction is executed, and the connecting process is performed again on the node 1-1.

On the other hand, when data from the node 1-1 arrives within the predetermined time Y in step S151), the received data of an amount of one packet is stored in the buffer memory 104, the values of the input counter and the number of packets stored in the buffer memory 104 by an amount of only one packet are updated (step S152), and the node 3-1 returns to the step S145.

When it is determined in the step S147 that data from the node 0-1 cannot be received (Y in step S147), it is also possible to inquire another node (in the case of FIG. 1, the node 1-2 or 1-3) connected to the node 0-1, send a data request message to the another node, and check whether data can be distributed or not.

By the above processes, as shown in FIG. 8B, data is input to the buffer memory 104 in the node 3-1 from a plurality of routes, and the necessary storage amount can be promptly recovered.

In a manner similar to the node 3-1, the node 3-2 receives data from a plurality of routes and recovers to a necessary storage amount. The nodes 4-1 and 4-2 lower than the node 3-2 immediately below the node 2-1 whose relay function stops also receive data from a plurality of routes and recover a necessary storage amount promptly. The nodes 4-1 and 4-2 lower than the node 3-2 immediately below the node 2-1 whose relay function stops may not receive data from a plurality of routes but the node 3-2 may distribute data to the lower-order nodes 4-1 and 4-2 at a speed higher than that in the normal state as in the first embodiment.

In the foregoing modification, by connecting nodes at different hierarchical levels to a node which distributes data, a plurality of paths to the node are formed. Consequently, even in the case where the possibility of occurrence of a failure such as stop of the relay function varies among hierarchical levels, sufficient redundancy can be assured reliably.

(II) Second Embodiment

A second embodiment as another embodiment according to the present invention will now be described with reference to FIGS. 9 to 12.

Figure 9:
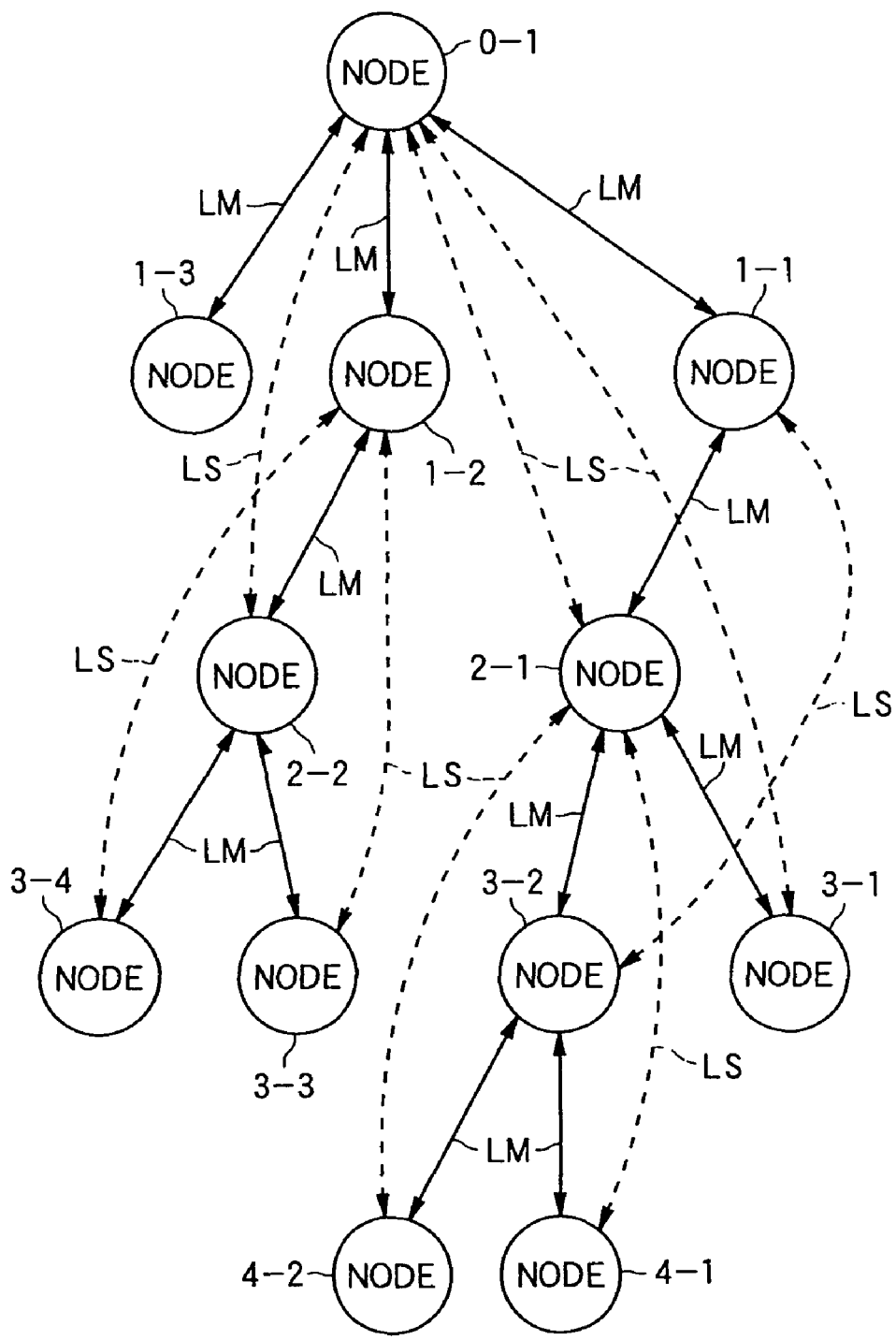
FIG. 9 is a block diagram showing a schematic configuration of a network system according to a second embodiment.
Figure 10:
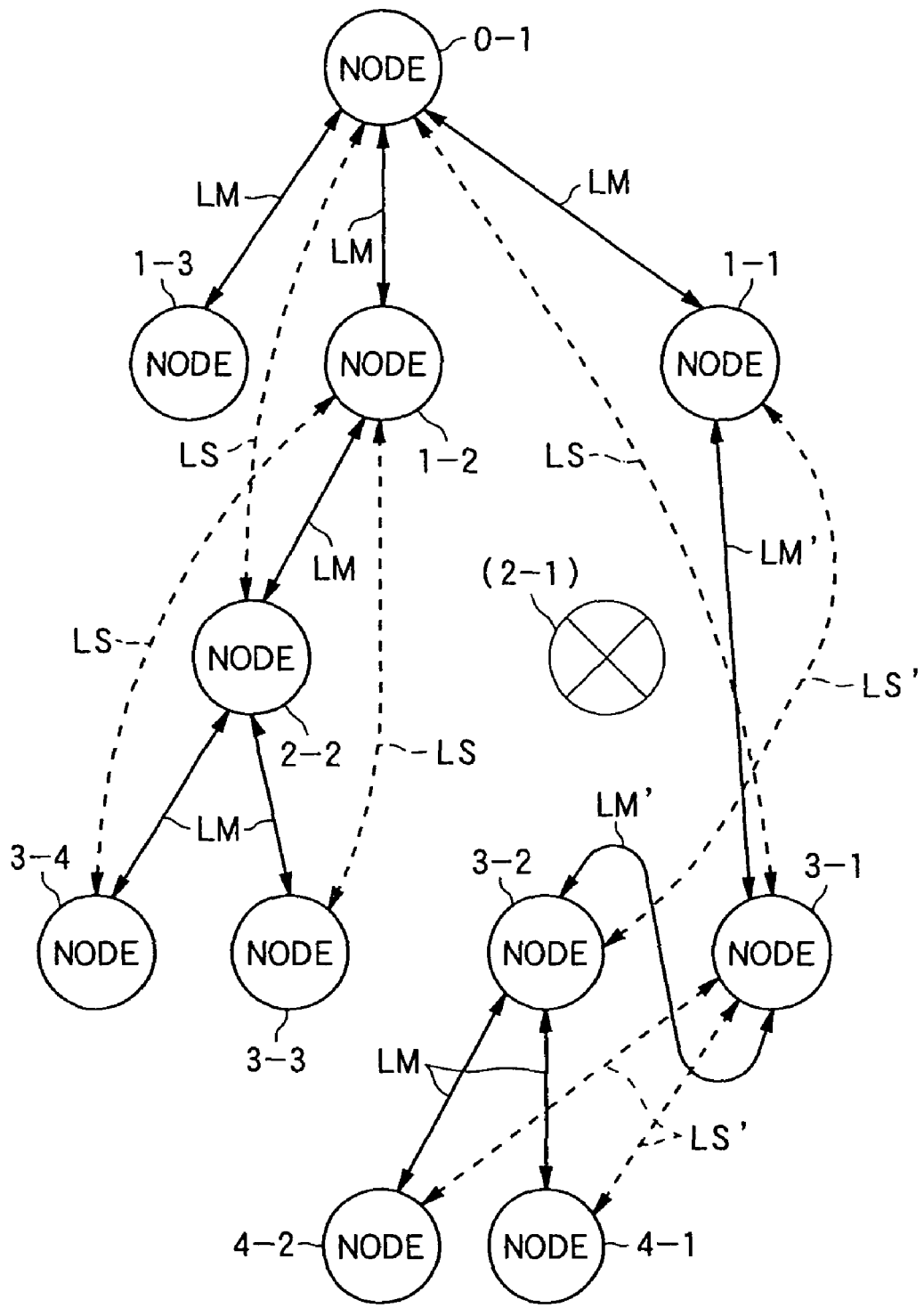
FIG. 10 is a block diagram showing a schematic configuration of the network system according to the second embodiment after the relay function in part of nodes stops.
Figure 11:
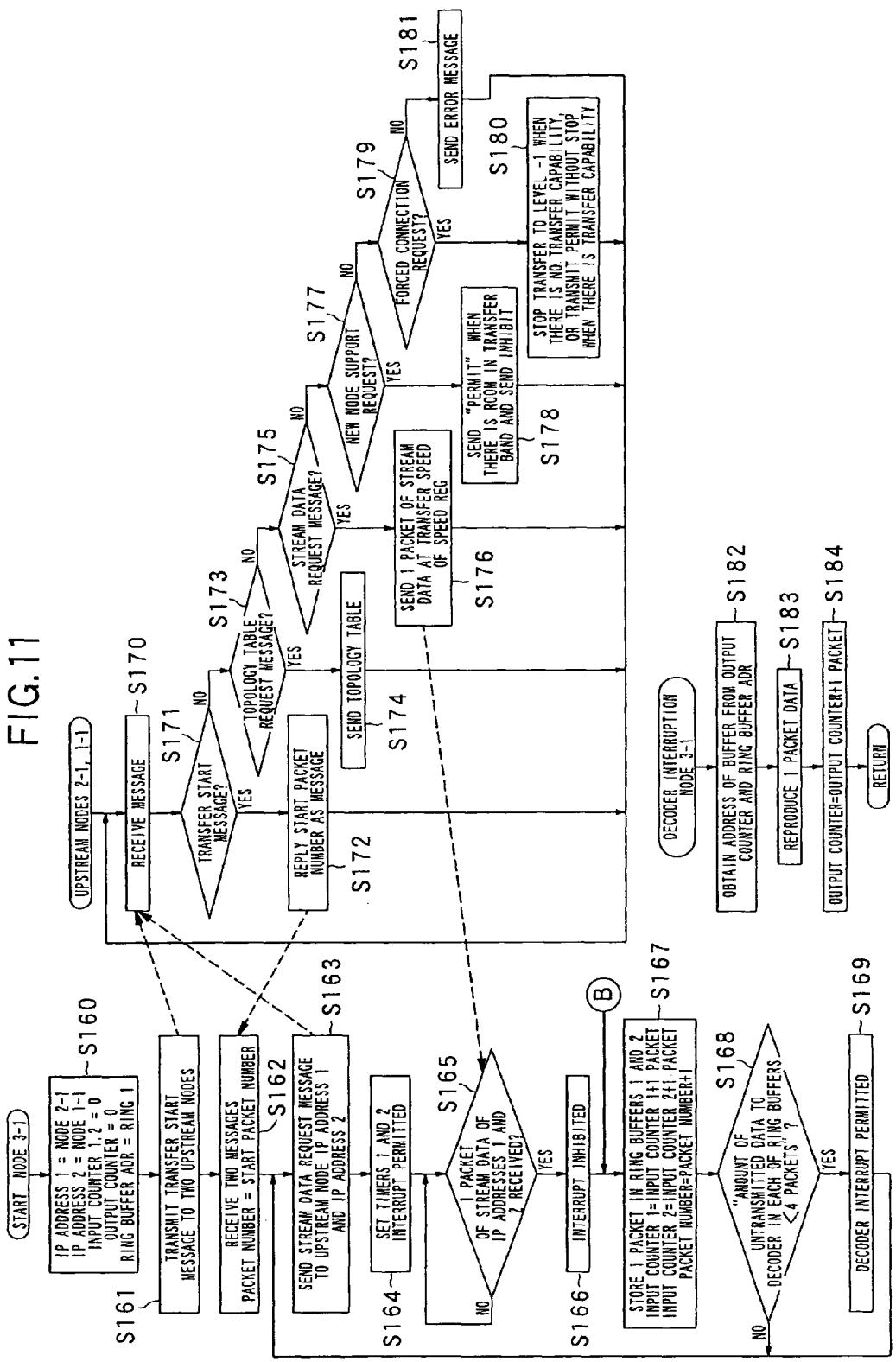
FIG. 11 is a flowchart showing normal distributing operation in the network system according to the second embodiment.
Figure 12:
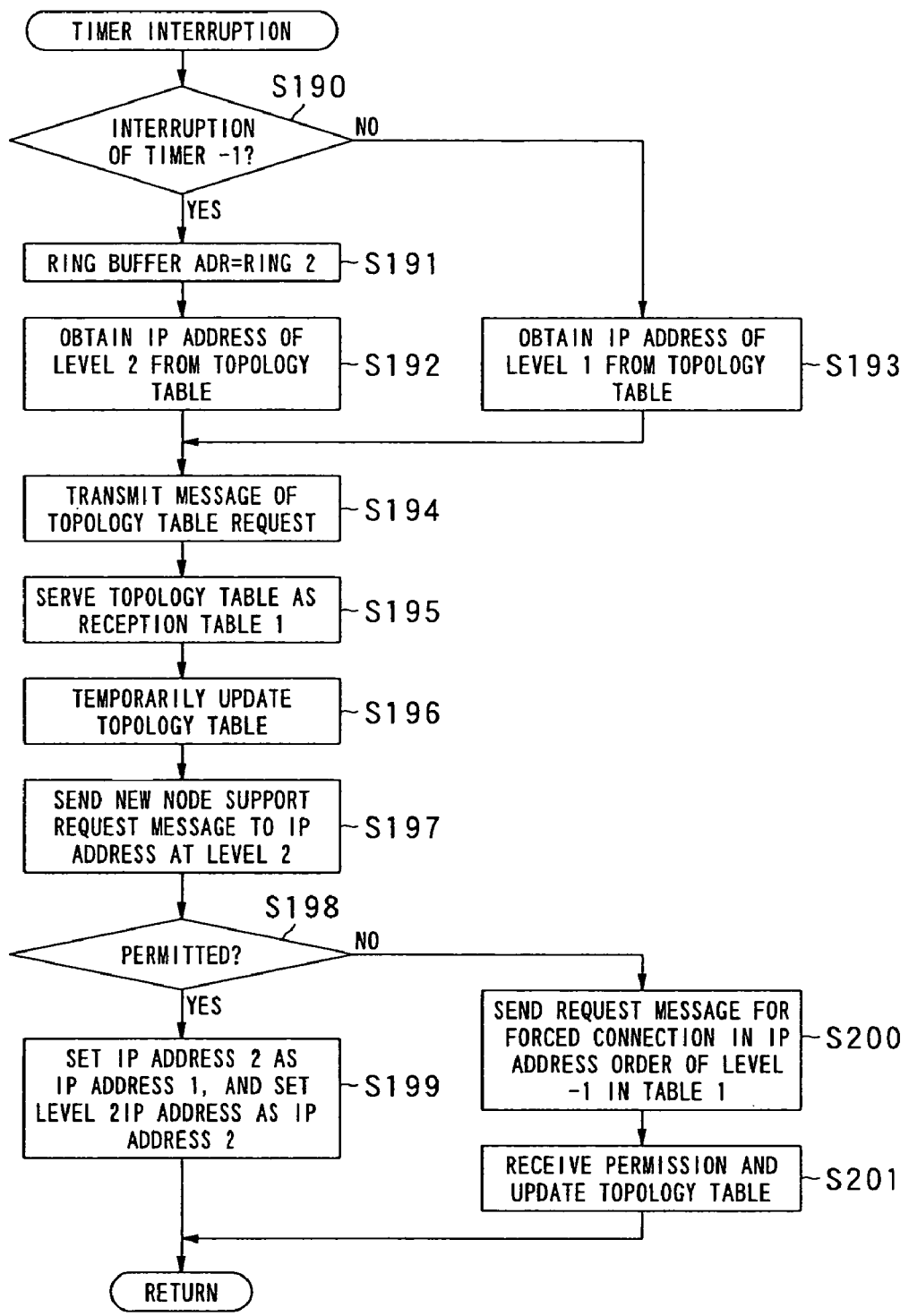
FIG. 12 is a flowchart showing operation in a lower-order node when the relay function stops in part of the nodes.

FIGS. 9 and 10 are block diagrams each showing a schematic configuration of a network system according to the second embodiment, and FIGS. 11 and 12 are flowcharts showing operations of the network system.

In the foregoing first embodiment, the case where the relay function in a node stops during reception of contents distributed via only one line L has been described. In the second embodiment described below, one node is preliminarily provided with two paths; a main path and a sub path and receives distributed contents.

As shown in FIG. 9, in a manner similar to the first embodiment, a network system NT2 according to the second embodiment is formed by a tree structure whose apex is the node 0-1 as a distributing apparatus. The network system NT2 includes the nodes 1-1, 1-2, and 1-3 as nodes constructing a first hierarchical level, the nodes 2-1 and 2-2 as nodes constructing a second hierarchical level, the nodes 3-1, 3-2, 3-3, and 3-4 are nodes constructing a third hierarchical level, and the nodes 4-1 and 4-2 as nodes constructing a fourth hierarchical level. The nodes are connected to each other via main lines LM as wire circuits or wireless circuits so as to be able to transmit/receive information to/from each other using the node 0-1 as an apex. A concrete example of each of the nodes is similar to that in the first embodiment.

In addition, in the network system NT2 according to the second embodiment, each of the nodes belonging to the second or lower hierarchical level is connected, by using the sub line LS, to a node immediately upper than the immediately upper-order node to which the main line LM is connected. In the normal distribution state, only contents distributed via the main line LM is provided for the reproducing process in each of the nodes. Contents distributed via the sub line LS is temporarily received and, after that, without being used for the reproducing process, distributed to another node at an immediately lower hierarchical level. It is also sufficient to receive contents distributed from the sub line Ls and distribute contents from the main line to a lower-order node.

The detailed configuration of a node according to the second embodiment is different from that of a node according to the first embodiment (refer to FIG. 2) with respect to the point that two table memories 103, two buffer memories 104, and two timers 106, each one for the main line LM and the other for the sub line LS, are provided. In a manner similar to the first embodiment, one CPU 100, one decoder 102, one broadband interface 105, one speaker 107, and one CRT 8 are provided. Further, in the topology table T stored in each of the table memories in one node, different from the first embodiment, an identifier indicating that the topology table it the topology table T for the main line LM or the topology table T for the sub line LS is added.

For example, when the relay function in the node 2-1 belonging to the network system NT2 in the state shown in FIG. 9 stops, each of the nodes 3-1 and 3-2 at a hierarchical level immediately below the node 2-1 automatically re-connects the main line LM and the sub line LS as a main line LM' and a sub line LS', respectively, as shown in FIG. 10, and continuously receives distributed contents. In this case, in FIG. 9, the node 3-1 is connected to the node 2-1 via the main line LM and is connected to the node 0-1 via the sub line LS. After the relay function in the node 2-1 stops, the node 3-1 connects the main line LM' to the node 1-1, and the connection of the sub line LS to the node 0-1 remains unchanged. On the other hand, in FIG. 9, the node 3-2 is connected to the node 2-1 via the main line LM and is connected to the node 1-1 via the sub line LS. After the relay function in the node 2-1 stops, the node 3-2 connects the main line LM' to the node 3-1 at the same hierarchical level, and the connection of the sub line LS to the node 1-1 remains unchanged. In such a manner, rules are strictly followed such that the main line LM is connected to the closest node, and the sub line LS is connected to a node at a hierarchical level immediately higher than the node to which the main line LM is connected.

For the nodes 4-1 and 4-2 belonging to the fourth hierarchical level, the node to which the sub line LS is connected in FIG. 9 loses the relay function, so that the main line LM remains unchanged and only the sub line LS' is connected to a new node (in the case of FIG. 10, the node to which the sub line LS' is connected is the node 3-1).

Next, topology reconfiguring operation executed in the nodes 3-1, 3-2, 4-1, and 4-2 in the case where the relay function in the node 2-1 actually stops will be described.

When the relay function in the node 2-1 stops as shown in FIG. 10, first, the nodes 3-1 and 3-2 immediately below the node 2-1 start connecting to a node at a hierarchical level higher than the node 2-1 in counting time of the timer 106 described in the first embodiment. During the counting of the timer 106, in a rout connected, the node 3-1 stores data distributed from the node 0-1 in the buffer 4, and the node 3-2 stores data distributed from the node 1-1 into the buffer 4, and distributes the data to the lower-order nodes 4-1 and 4-2. After reconfiguration of the topology, data distributed from the main line LM is stored in the buffer 4, and data distributed from the sub line LS is distributed to a lower-order node.

The node 3-1 or 3-2 having higher speed (in the case of FIG. 10, the node 3-1) is connected to the node 1-1. The node 3-1 connects the new main line LM' to the node 1-1, in addition, maintains the connection to the node 0-1 via the original sub line LS, and receives contents distributed from the node 0-1 (backup distribution).

On the other hand, the node 3-2 which cannot be connected to the node 1-1 is connected via the main line LM' to the node 3-1 belonging to the hierarchical level lower than the node 1-1 at present while maintaining the original sub line LS with the node 1-1. In this case, the node 3-2 can be reconnected directly to the node 0-1. However, a number of nodes are connected to the node 0-1 at present, so that the main line LM' is connected to the node 3-1 in reality.

With respect to the nodes 4-1 and 4-2 at the further lower-order level, the original sub lines LS are disconnected. Consequently, the nodes 4-1 and 4-2 inquire the node 3-2 belonging to the immediately higher order level of a node to which the sub line LS' is to be newly connected. As a result, it can be recognized that a new main line LM' is formed between the nodes 3-2 and 3-1, so that the node 4-1 or 4-2 which has inquired the node 3-2 first forms a new sub line LS' to the node 3-1.

Next, operations executed when a new node is connected to the network system NT2 according to the second embodiment and distribution of contents is started and executed in the normal state including the new node will be described in a lump with reference to FIG. 11. FIG. 11 is a flowchart showing an example of the case where the node 3-1 is newly connected to the node 2-1 in the network system NT2, thereby obtaining the network system NT2 shown in FIG. 9, and distribution of contents is executed to the node 3-1.

In at least a node to which another node is connected at a lower hierarchical level via the main line LM or the sub line LS among the nodes in the network system NT2 according to the second embodiment, processes in the flowchart shown in the upper right are always executed.

Specifically, whenever a message is transmitted from a node at a lower hierarchical level (step S170), the type of the message is determined in order (steps S171, S173, S175, S177, or S179).

When the received message is the start message (Y in step S171), the packet number of data being reproduced at present by the node is sent back as a start packet number (step S117).

When the received message is the topology data table request message Y in step S173), the topology table T according to the type of the line (the main line or sub line) to which the node sending back the topology data table request message is connected out of topology tables T presently provided for the node is sent back (step S174).

When the received message is the data request message (Y in step S175), data of one packet is transmitted at the reproduction speed designated in the data request message (step S176).

When the received message is a new node support request message that inquires of the possibility of data distribution newly using a sub line LS (Y in step S177), distribution using the sub line LS is possible or not is determined on the basis of the relation with another node which is distributing data at that time. If it is possible, a message of "permit" is replied. On the other hand, if it is impossible, a message of "inhibit" is replied (step S178).

When the received message is a forced connection request message indicative of forced distribution of data using a new sub line LS (Y in step S179), in a manner similar to the case of step S177, whether distribution using the sub line L is possible or not is determined on the basis of the relation with another node that is distributing data at that time. If it is possible, a message of "permit" is replied. On the other hand, if it is impossible, distribution of data is stopped. The distribution is to the node whose level information is "−1" in the topology table T according to the type of the line to which the node that has sent the forced connection request message is connected out of the topology tables presently provided for the node (step S180).

When the received message is not any one of the messages (N in step S179), a preset error message is sent back to the node that has sent the message (step S181).

In each of nodes in which the above-described processes are continuously executed, data from a node whose level information in the topology table T corresponding to the main line LM is "1" is decoded by the decoder 102 and the decoded data is output. On the other hand, data from a node whose level information in the topology table T corresponding to the sub line LS is "1" is distributed to another node at a lower hierarchical level without being decoded.

In the network system NT2 operating in such a state, when the node 3-1 newly enters the network system NT2 by physically being connected to the node 2-1, first, the CPU 100 in the new node 3-1 sets two buffer memories 104 (for the main line LM and the sub line LS) in the node 3-1, sets the IP address of a node indicative of the data supply source, and sets the node 0-1 at the immediately higher hierarchical level on the sub line LS (the IP addresses of the two nodes are obtained by the node 3-1 from the node 2-1 when the node 3-1 is connected to the node 2-1). To calculate an address in which data is stored in each of the buffer memories 104, an input counter 1 (16 bits), an input counter 2 (16 bits), and the output counter (16 bits) are initialized to "0". The input counter 1 counts the number of bytes of received data distributed from the node 2-1 via the main line LS. The input counter 2 counts the number of bytes of received data distributed from the node 0-1 via the sub line LS. The output counter shows an amount of data reproduced by the decoder 102. Further, a buffer address (in FIGS. 11 and 12, properly indicated as "ring buffer ADR") indicative of a "ring buffer 1" is set in the buffer memory 104 corresponding to the main line LM at the time point (step S160).

After completion of the necessary initializing process, the CPU 100 in the node 3-1 refers to the topology tables T in the table memories 3 and transmits a start message requesting the nodes 2-1 and 0-1 to start transfer of contents data (step S161).

Next, the CPUs 100 in the nodes 2-1 and 0-1 which have received the start message (step S170) send, as start packet numbers, the packet numbers of data presently reproduced by the nodes 2-1 and 0-1 to the ode 3-1 (step S172).

The node 3-1 obtains the start packet numbers from the nodes 2-1 and 0-1, stores them into the areas of corresponding packet numbers on the buffer memory 104 corresponding to the lines (step S162), and transmits the data request message requesting data of actual contents to the nodes 2-1 and 0-1 (step S163). The data request message includes information of packet numbers of data to be transmitted from the nodes 3-1 and 2-1 (reproducing process) and the node 0-1 (for distributing data immediately to the lower-order hierarchical level).

The nodes 2-1 and 0-1 that have received the data request message (in step S170, and "Y" in S175) transmit data of an amount of one packet to the node 3-1 at the reproduction speed designated in the data request message (via the main line LM and the sub line LS) (step S176).

In parallel with the operations, the node 3-1 is set to output the data request message, simultaneously, start counting with the timers in the nodes 3-1 and, when the counting becomes "0", generate the timer interrupt instruction independently (step S164). The node 3-1 waits until predetermined time lapses in the counting of each timer 106 (step S165). When data from the nodes 2-1 and 0-1 does not arrive within predetermined time (N in step S165), the node 3-1 executes the timer interrupt instruction, and performs the connecting process again on the nodes 2-1 and 0-1.

On the other hand, when data from the nodes 2-1 and 0-1 arrives within the predetermined time Y in step S165), the node 3-1 inhibits execution of a timer interrupt instruction (step S166), and stores an amount corresponding to one packet of the received data into the buffer memory 104. Accompanying the process, the values of the input counters 1 and 2 and the numbers of packets stored in the buffer memory 104 are updated only by an amount of one packet (step S167).

The node 3-1 determines whether the amount of data which is stored in each of the buffer memories 104 and has not been output to the decoder 102 becomes four packets (that is, the storage amount of the quarter of the buffer memory 104) or not (step S168). When the amount is less than four packets (Y in step S168), the node 3-1 returns to the step S163 to receive the following packets from the nodes 2-1 and 0-1 and repeats the above-described processes. On the other hand, when the amount of data stored in each of the buffer memories 104 becomes four packets (N in step S168), outputs only data obtained via the main line LM to the decoder 102 (step S169), and returns to the process in the step S163 to receive the following data from the nodes 2-1 and 0-1.

In the process of the step S169, when data of an amount of four packets is stored in the buffer memory 104 corresponding to the main line LM and is output to the decoder 102, the decoder 102 repeats the following operations only by an amount of four packets, thereby performing the data reproducing process. In the operations, the decoder 102 obtains the buffer address indicative of the buffer memory 104 at that time and the address of data output from the buffer memory 104 on the basis of the value of the output counter in the buffer memory 104 indicated by the buffer address (step S182), decodes and reproduces the data only by one packet (step S183), and increments the value of the output counter in the buffer memory 104 only by one packet (step S184).

By executing the data distribution from the node 2-1, the reproducing process in the node 3-1, and distribution using the sub line LS from the node 0-1 as described above, the data reproducing process in the node 3-1 is executed while maintaining the data amount in each of the buffer memories 104 to be constant.

Next, processes performed in the case where the contents relay function in the node 2-1 stops for a reason such that the power switch is turned off in the network system NT2 shown in FIG. 9 will be concretely described with reference to FIG. 12.

In the network system NT2 according to the second embodiment, when the relay function in the node 2-1 stops for the above-described reason, as shown in FIG. 10, the nodes 3-1 and 3-2 and the nodes 4-1 and 4-2 connected to the original node 2-1 automatically execute topology reconstructing operation, and continue distribution of contents with the topology in the mode shown in FIG. 10.

When the relay function in the node 2-1 stops as shown in FIG. 11, the CPU 100 in each of the nodes 3-1 and 3-2 at the immediately lower hierarchical level (since distribution in the normal state shown in FIG. 11 continues, the processes described with reference to FIG. 11 are repeated) cannot receive data from the node 2-1 even after predetermined time elapses in the process of the step S165 shown in FIG. 11. When data cannot be received even after lapse of the predetermined time (N in step S165), the CPU 100 in each of the nodes 3-1 and 3-2 recognizes that the relay function in the node 2-1 at the immediately higher hierarchical level stops and the topology is disconnected.

After that, on recognition of disconnection of the topology, the interrupt instruction shown in FIG. 12 is executed, with reference to the topology tables T stored in the table memories 103, the topology is reconfigured as shown in FIG. 10.

Specifically, as shown in FIG. 12, when an interrupt instruction is executed, the timer 106 in which predetermined time has elapsed is the timer 106 corresponding to the main line LM (in FIG. 12, indicated as "timer 1") or not is determined (step S190). When it is the timer 106 corresponding to the main line LM (Y in step S190), the value of the buffer address is changed to the value indicative of the buffer memory 104 corresponding to the sub line LS so as to set the buffer memory 104 corresponding to the sub line LS to the buffer memory 104 to output data to the decoder 102 (step S191).

Next, a topology table request message corresponding to the main line LM is transmitted to a ode whose value of level information is "2" (in the case of FIG. 10, the node 1-1) in the main line LM (steps S192 and S194), and a topology table T corresponding to the main line M is obtained from the topology tables T in the node (step S195).

By using the obtained topology table T, the topology tables T in the nodes 3-1 and 3-2 corresponding to the main line LM are updated (step S196).

Next, the new node support request message inquiring the node of whether the sub line LS can be connected to the node (the node 0-1 in the case of FIG. 10) whose level information is "2" in the updated topology table T or not (step S197).

Whether a reply to the new node support request message is "permit" or not is checked (step S198). If it is "permit" (Y in step S198), the IP address of the node to which the sub line LS was connected before the relay function stops is rewritten that the main line LM is connected at present, and the IP address of a node (in the case of FIG. 10, the node 0-1) to which the sub line LS is newly connected is written as the IP address of a node whose level information is "2" in the topology table T corresponding to the present (new) sub line LS into the topology table T (step S199).

On the other hand, when it is determined in the step S198 that the reply to the new node support request message is "inhibit" (N in step S198), the forced connection request message is transmitted to the node 1-1 at the hierarchical level immediately lower than the node 0-1 to which the sub line LS is originally connected (step S200).

When the node 1-1 receives the forced connection message and the sub line LS can be connected in the node 1-1, the connection is permitted in the node 1-1 and the topology table T in the node 3-1 is updated (step S201). When it is impossible, distribution of data from the node 0-1 to the node 1-1 is stopped. The node 1-1 to which data transfer is stopped executes the above-described process, thereby reconfiguring the topology.

On the other hand, when it is determined in the step S190 that the interrupt instruction is executed in the timer 106 corresponding to the sub line LS (N in step S190), the relay function of the node 2-1 at the immediately higher hierarchical level operates on the main line LM. Consequently, the topology table request message corresponding to the main line LM is transmitted to the node 2-1 (steps S193 and S194), a topology table T in the node 2-1 is obtained (step S195), and the processes in step S196 and subsequent steps are executed.

As described above, in the network system NT2 of the second embodiment, the main lines LM and the sub lines LS are formed so as to connect a plurality of nodes to one node, data distributed via the main lines LM is used for reproducing process in the one node and the like and distribution to other nodes belonging to a lower hierarchical level. On the other hand, data distributed via the sub lines LS is used for distribution to the other nodes belonging to lower-order hierarchical levels. By connecting multiple lines to each of nodes, redundancy can be increased in preparation of stop in the relay function in any of nodes, and the reproducing process and the like in nodes belonging to the lower hierarchical levels can be prevented from being stopped.

When the relay function in a node belonging to a higher hierarchical level stops on the main line LM to one node, data distributed via the sub line LS is switched so as to be provided for the reproducing process or the like, so that the reproducing process or the like in the one node is not interrupted.

Further, when data distributed via the sub line LS is switched so as to be provided for the reproducing process or the like, any node belonging to a higher hierarchical level is retrieved and a new sub line LS is formed by connecting the retrieved node. Consequently, even when the sub line LS is used as the main line LM, a new sub line LS is formed, and redundancy can be assured and maintained.

Further, when the relay function in a node belonging to a higher hierarchical level stops on the sub line LS to one node, any node belonging to a higher hierarchical level is retrieved and a new sub line LS is formed by connecting the retrieved node. Consequently, even when the relay function in a node on the sub line LS stops, a new sub line LS is formed, and redundancy can be assured and maintained.

Since a node at a higher hierarchical level is retrieved so that another node at a hierarchical level to which one node belongs is included in the new main line LM, supply of distributed information can be received via a node at the same hierarchical level.

In each of the foregoing embodiments, as a method of detecting stop of the relay function in any of the nodes, other than the above-described method, a node may periodically detect whether there is a response to a node at a higher or lower hierarchical level. For example, when the relay function of the node 2-1 itself in each of the embodiments stops, the stop may be notified to the node 101 at the higher hierarchical level or the nodes 3-1 and 3-2 at the lower hierarchical level.

The above-described series of connection mode control processes can be also performed under control of another server apparatus on the outside on the network system NT or NT2. In this case, the server apparatus has information of the connection modes of the nodes in the network system NT or NT2. By sending an inquiry from the nodes 3-1 and 3-2 to the server apparatus, the node 1-1 at the hierarchical level immediately higher than the node 2-1 whose relay function stops is recognized.

Further, the decoder 102, the CRT 108, and the like for reproducing contents may be also constructed so as to connect a reproducing device or the like in a place other than a node via another network.

Further, it is also possible to record a program corresponding to the flowcharts of FIGS. 4, 7, 8, 11, and 12 on a computer-readable storage medium such as a flexible disk or a hard disk or obtain the program via the Internet or the like and record it, and read and execute the program by a general computer, thereby making the computer function as the CPU 100 according to the embodiments.

INDUSTRIAL APPLICABILITY

As described above, the application can be used for the field of distributing contents by using a network system having a tree structure. In particular, when the invention is applied to the field of distributing contents such as real-time broadcasting of a movie, music, or the like in which interruption of distribution is inconvenient, conspicuous effects are obtained.

The present invention is not confined to the configuration listed in the foregoing embodiments, but it is easily understood that the person skilled in the art can modify such configurations into various other modes, within the scope of the present invention described in the claims.

What is claimed is:

1. A connection mode controlling apparatus for controlling a connection mode among a distributor as a distribution source of distribution information and a plurality of relay devices connected to the distributor in a tree structure which is configured by a plurality of hierarchical levels in a network system in which the distribution information is distributed, the connection mode controlling apparatus comprising:

a retrieval processor unit, in response to stopping a relay function in a first relay device which is relaying the distribution information to a second relay device and a reproducing process of reproducing the distributed distribution information being executed in the second relay device, configured to retrieve a third relay device capable of relaying the distribution information;

a connecting processor unit configured to connect the retrieved third relay device to the second relay device; and a distribution continuing processor unit configured to continue the distribution of the distribution information to the second relay device via the third relay device by making distribution speed of the distribution information via the third relay device to the second relay device faster than distribution speed before the relay function in the first relay device stops from the first relay device to the second relay device.

2. The connection mode controlling apparatus according to claim 1, wherein the distribution continuing processor unit continues the distribution and the distribution speed is increasing gradually via the third relay device, to maximum speed as an upper limit, the maximum speed specified in a line connecting the distributor and the relay devices.

3. The connection mode controlling apparatus according to claim 1, wherein the distribution continuing processor unit continues the distribution by making distribution speed via the third relay device to the second relay device faster than distribution speed before the relay function in the first relay device stops from the first relay device to the second device, until a storage amount of distributed distribution information in the second relay device becomes a predetermined amount.

4. The connection mode controlling apparatus according to claim 1, wherein the forming processor unit forms the main path and the sub path thereby connecting each of the relay devices at different hierarchical levels to the one of the relay devices.

5. The connection mode controlling apparatus according to claim 1,
wherein the connection mode controlling apparatus is at least one of the relay devices.

6. A connection mode controlling apparatus for controlling a connection mode among a distributor as a distribution source of distribution information and a plurality of relay devices connected to the distributor in a tree structure which is configured by a plurality of hierarchical levels in a network system in which the distribution information is distributed, the connection mode controlling apparatus comprising:

a forming processor unit configured to form a main path and a sub path thereby connecting one of the relay devices to upper level relay devices belonging to a hierarchical level upper than the one of the relay devices, the main path in which the distribution information is distributed from a first upper level relay device to the one of the relay devices, the sub path in which the distribution information is distributed from a second upper level relay device being different from the first upper level relay device to the one of the relay devices; and a distribution control processor unit configured to execute a first controlling and a second controlling, the first controlling controls to distribute the distribution information which is distributed to the one of the relay devices via the main path to another relay device belonging to a hierarchical level lower than the one of the relay devices and to execute reproducing process of reproducing the distribution information which is distributed to the one of the relay devices via the main path at the one of the relay devices, and the second controlling controls to distribute the distribution information which is distributed to the one of the relay devices via the sub path to the another relay device and to store the distribution information distributed to the one of the relay devices via the sub path at the one of the relay devices in a storing unit, wherein the second upper level relay device belongs to a hierarchical level upper than the first upper level relay device.

7. The connection mode controlling apparatus according to claim 6, further comprising a switching processor unit, in response to stopping a relay function of the one of the upper level relay devices on the main path, configured to switch the distribution information distributed to the one of the relay devices via the sub path so as to be reproduced in the reproducing process of the one of the relay devices.

8. The connection mode controlling apparatus according to claim 7, further comprising a retrieval processor unit, in response to being switched the distribution information distributed to the one of the relay devices via the sub path by the switching processor unit so as to be reproduced in the reproducing process of the one of the relay devices, configured to retrieve the distributor or a new one of the upper level relay devices,
wherein the forming processor unit forms a new sub path thereby connecting the distributor or the new relay device retrieved by the retrieval processor unit to the one of the relay devices.

9. The connection mode controlling apparatus according to claim 8, wherein the retrieval processor unit retrieves the distributor or the new relay device so that another relay device at the hierarchical level to which the one of the relay devices belongs is included in the new main path.

10. The connection mode controlling apparatus according to claim 6, further comprising a retrieval processor unit, in response to stopping a relay function in the relay device belonging to the hierarchical level higher than the one of the relay devices on the sub path, configured to retrieve either the distributor or the new relay device belonging to the hierarchical level higher than the one of the relay devices,
wherein the forming processor unit forms a new sub path thereby connecting the distributor or the new relay device retrieved by the retrieval processor unit to the one of the relay devices.

11. The connection mode controlling apparatus according to claim 6,
wherein the first upper level relay device belongs to the hierarchical next level upper than the one of the relay devices, and
wherein the forming processor unit forms the sub path which includes the second upper level relay device belongs to the hierarchical at least one level upper than the first upper level relay device.

12. A connection mode controlling method of controlling a connection mode among a distributor as a distribution source of distribution information and a plurality of relay devices connected to the distributor in a tree structure which is configured by a plurality of hierarchical levels in a network system in which the distribution information is distributed, the connection mode controlling method comprising:

retrieving, in response to stopping a relay function in a first relay device which is relaying the distribution information to a second relay device and a reproducing process of reproducing the distributed distribution information being executed in the second relay device, a third relay device capable of relaying the distribution information;

connecting the retrieved third relay device to the second relay device; and continuing distribution of the distribution information to the second relay device via the third relay device by making distribution speed of the distribution information via the third relay device to the second relay device faster than distribution speed before the relay function in the first relay device stops from the first relay device to the second relay device.

13. A connection mode controlling method of controlling a connection mode among a distributor as a distribution source of distribution information and a plurality of relay devices connected to the distributor in a tree structure which is configured by a plurality of hierarchical levels in a network system in which the distribution information is distributed, the connection method controlling method comprising:

forming a main path and a sub path thereby connecting one of the relay devices to upper level relay devices belonging to a hierarchal level upper than the one of the relay devices, the main path in which the distribution information is distributed from a first upper level relay device to the one of the relay devices, the sub path in which the distribution information is distributed from a second upper level relay device being different from the first upper level relay device to the one of the relay devices; and executing a first controlling step and a second controlling step, the first controlling step controls to distribute the distribution information which is distributed to the one of the relay devices via the main path to another relay device belonging to a hierarchical level lower than the one of the relay devices and to execute reproducing process of reproducing the distribution information which is distributed to the one of the relay devices via the main path at the one of the relay devices, and the second controlling step controls to distribute the distribution information which is distributed to the one of the relay devices via the sub path to the another relay device and to store the distribution information distributed to the one of the relay devices via the sub path at the one of the relay devices in a storing unit, wherein the second upper level relay device belongs to a hierarchical level upper than the first upper level relay device.

14. A non-transitory computer-readable storage medium that stores a computer-executable program for controlling a connection mode among a distributor as a distribution source of distribution information and a plurality of relay devices connected to the distributor in a tree structure which is configured by a plurality of hierarchical levels in a network system in which the distribution information is distributed, the program causing a computer to perform steps comprising:

retrieving, in response to stopping a relay function in a first relay device which is relaying the distribution information to a second relay device and a reproducing process of reproducing the distributed distribution information being executed in the second relay device, a third relay device capable of relaying the distribution information;

connecting the retrieved third relay device to the second relay device; and continuing distribution of the distribution information to the second relay device via the third relay device by making distribution speed of the distribution information via the third relay device to the second relay device faster than distribution speed before the relay function in the first relay device stops from the first relay device to the second relay device.

15. A non-transitory computer-readable storage medium that stores a computer-executable program for controlling a connection mode among a distributor as a distribution source of distribution information and a plurality of relay devices connected to the distributor in a tree structure which is configured by a plurality of hierarchical levels in a network system in which the distribution information is distributed, the program causing a computer to perform steps comprising:

forming a main path and a sub path thereby connecting one of the relay devices to upper level relay devices belonging to a hierarchical level upper than the one of the relay devices, the main path in which the distribution information is distributed from a first upper level relay device to the one of the relay devices, the sub path in which the distribution information is distributed from a second upper level relay device being different from the first upper level relay device to the one of the relay devices; and executing a first controlling step and a second controlling step, the first controlling step controls to distribute the distribution information which is distributed to the one of the relay devices via the main path to another relay device belonging to a hierarchical level lower than the one of the relay devices and to execute reproducing process of reproducing the distribution information which is distributed to the one of the relay devices via the main path at the one of the relay devices, and the second controlling step controls to distribute the distribution information which is distributed to the one of the relay devices via the sub path to the another relay device and to store the distribution information distributed to the one of the relay devices via the sub path at the one of the relay devices in a storing unit, wherein the second upper level relay device belongs to a hierarchical level upper than the first upper level relay device.

* * * * *